(12) United States Patent
Takeda et al.

(10) Patent No.: US 11,943,159 B2
(45) Date of Patent: Mar. 26, 2024

(54) REFERENCE SIGNAL MAPPING

(71) Applicant: QUALCOMM Incorporated, San Diego, CA (US)

(72) Inventors: Kazuki Takeda, Tokyo (JP); Peter Gaal, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/659,322

(22) Filed: Apr. 14, 2022

(65) Prior Publication Data

US 2023/0336303 A1    Oct. 19, 2023

(51) Int. Cl.
  *H04L 5/00*    (2006.01)
(52) U.S. Cl.
  CPC .................... *H04L 5/0051* (2013.01)
(58) Field of Classification Search
  None
  See application file for complete search history.

(56) References Cited

U.S. PATENT DOCUMENTS

| | | | | |
|---|---|---|---|---|
| 2022/0078770 A1* | 3/2022 | Wang | .................... | H04W 72/04 |
| 2022/0150011 A1* | 5/2022 | Kim | ...................... | H04L 5/0048 |
| 2022/0182843 A1* | 6/2022 | Park | .................... | H04L 25/0226 |
| 2022/0225286 A1* | 7/2022 | Cirik | ................. | H04W 72/0446 |
| 2022/0263630 A1* | 8/2022 | Fehrenbach | .......... | H04L 5/0053 |
| 2022/0303080 A1* | 9/2022 | Sun | ........................ | H04L 5/0053 |
| 2023/0040433 A1* | 2/2023 | Zhang | .................... | H04L 5/0055 |
| 2023/0156740 A1* | 5/2023 | Kim | ....................... | H04L 5/0094 |
| | | | | 370/329 |

OTHER PUBLICATIONS

CMCC: "Discussion on DMRS and Multiple REG Bundles Preceding of NR-PDCCH", 3GPP TSG RAN WGI Meeting NR AH#3, R1-1716549, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 12, 2017, 7 pages, XP051330099, the whole document.
International Search Report and Written Opinion—PCT/US2023/065583—ISA/EPO—dated Aug. 7, 2023.

(Continued)

*Primary Examiner* — Diane L Lo
(74) *Attorney, Agent, or Firm* — Arent Fox, LLP

(57) ABSTRACT

Certain aspects are directed to a user equipment (UE) configured to receive reference signals from a network node via multiple resource element groups (REGs) including at least one REG carrying a downlink transmission. In some examples, the UE may be configured to receive, from the network node, communication parameters for a downlink transmission, the communication parameters indicative of a first resource element group (REG) bundle and a second REG bundle. In some examples, the UE may receive the downlink transmission via the first REG bundle. In some examples, the UE may be configured to perform channel estimation of the downlink transmission based on reference signals transmitted via the first REG bundle and the second REG bundle.

28 Claims, 14 Drawing Sheets

(56) References Cited

OTHER PUBLICATIONS

ITRI: "Discussion on REG Bundle Size", 3GPP TSG RAN WG1 Meeting NR_AH2, R1-1710973, 3rd Generation Partnership Project, Mobile Competence Centre, 650, Route Des Lucioles, F-06921 Sophia-Antipolis Cedex, France, vol. RAN WG1, No. Qingdao, China, Jun. 27, 2017-Jun. 30, 2017 Jun. 16, 2017, 9 pages, XP051304419, the whole document.

ZTE: "REG Bundle Size and REG bundle Mapping for NR-PDCCH", 3GPP TSG RAN WG1 Meeting #90, R1-1712663, 3rd Generation Partnership Project, Mobile Competence Centre, 650, Route Des Lucioles, F-06921 Sophia-Antipolis Ced, vol. RAN WG1, No. Prague, Czech Republic, Aug. 21, 2017-Aug. 25, 2017, Aug. 20, 2017, pp. 1-34, XP051315476, p. 1, para 1 p. 4, para 3 p. 7, para 4.

\* cited by examiner

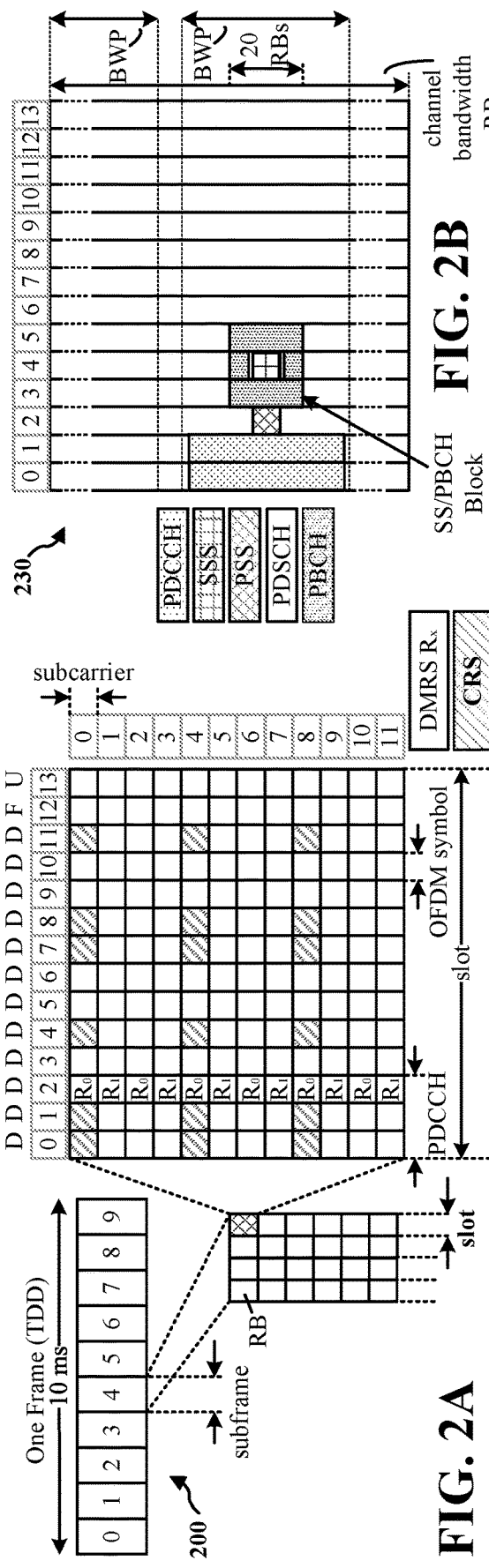
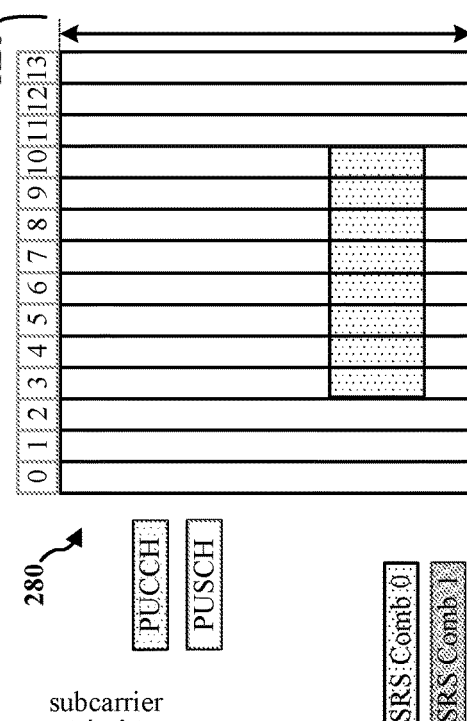
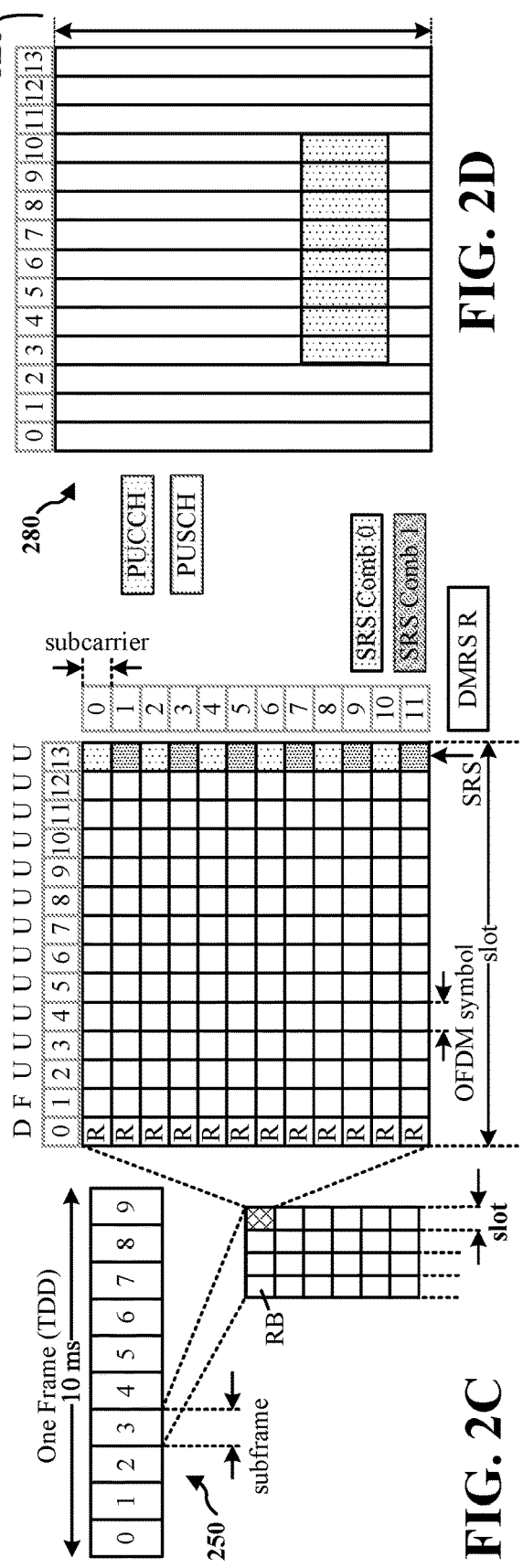
FIG. 2A
FIG. 2B
FIG. 2C
FIG. 2D

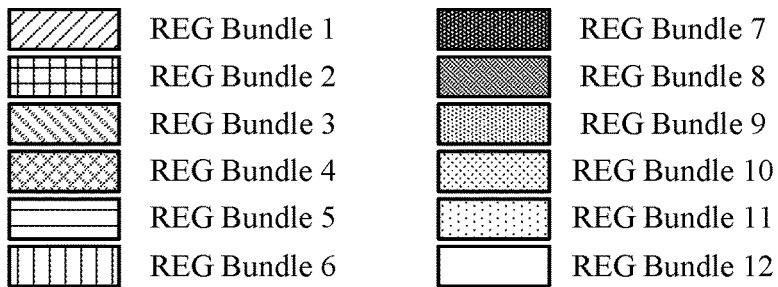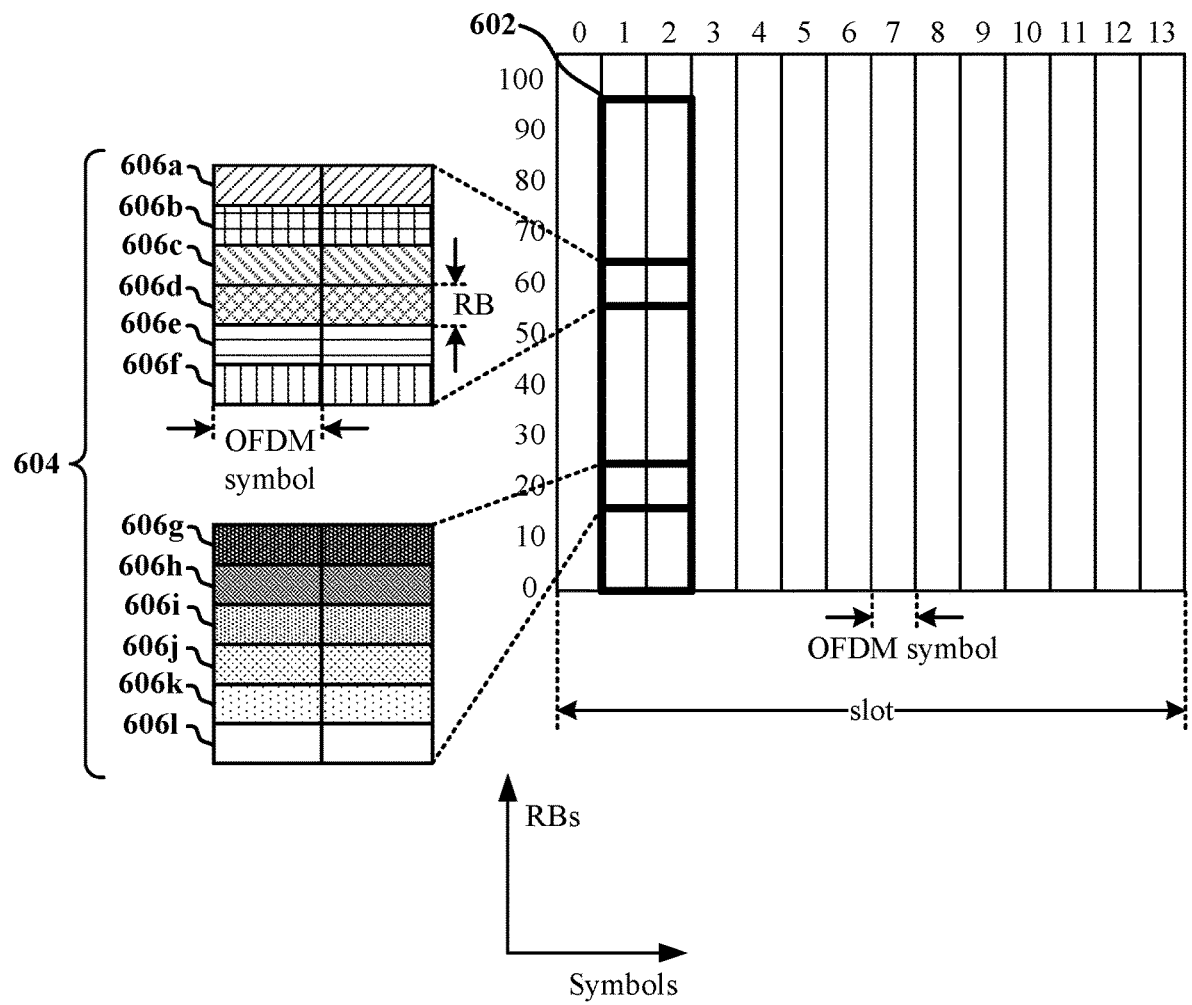
FIG. 6

1300

1302 determine a first superset of a plurality of supersets, wherein the first superset is uniquely mapped to at a first resource element group (REG) bundle and a second REG bundle

1304 transmit communication parameters for a downlink transmission, the communication parameters indicative of the first REG bundle and the second REG bundle

1306 transmit the downlink transmission via the first REG bundle

1308 transmit a reference signal for demodulating the first REG bundle via the first REG bundle and the second REG bundle

FIG. 13

REFERENCE SIGNAL MAPPING

BACKGROUND

Technical Field

The present disclosure generally relates to communication systems, and more particularly, to expanding the resources used for measuring reference signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication by a user equipment (UE). In some examples, the method includes receiving, from a network node, communication parameters for a downlink transmission, the communication parameters indicative of a first resource element group (REG) bundle and a second REG bundle. In some examples, the method includes receiving the downlink transmission via the first REG bundle. In some examples, the method includes performing channel estimation of the downlink transmission based on reference signals transmitted over the first REG bundle and the second REG bundle.

Certain aspects are directed to a method for wireless communication by a network node. In some examples, the method includes determining a first superset of a plurality of supersets, wherein the first superset is uniquely mapped to at a first resource element group (REG) bundle and a second REG bundle. In some examples, the method includes transmitting communication parameters for a downlink transmission, the communication parameters indicative of the first REG bundle and the second REG bundle. In some examples, the method includes transmitting the downlink transmission via the first REG bundle. In some examples, the method includes transmitting a reference signal for demodulating the first REG bundle via the first REG bundle and the second REG bundle.

Certain aspects are directed to a user equipment (UE) configured for wireless communication. The UE may include a processor, a memory coupled with the processor, and instructions stored in the memory and operable, when executed by the processor, to cause the UE to receive, from a network node, communication parameters for a downlink transmission, the communication parameters indicative of a first resource element group (REG) bundle and a second REG bundle. In some examples, the UE may further be configured to receive the downlink transmission via the first REG bundle. In some examples, the UE may further be configured to perform channel estimation of the downlink transmission based on reference signals transmitted over the first REG bundle and the second REG bundle.

Certain aspects are directed to a network node configured for wireless communication, comprising a processor, a memory coupled with the processor, and instructions stored in the memory and operable, when executed by the processor, to cause the network node to determine a first superset of a plurality of supersets, wherein the first superset is uniquely mapped to at a first resource element group (REG) bundle and a second REG bundle. In some examples, the network node may further be configured to transmit communication parameters for a downlink transmission, the communication parameters indicative of the first REG bundle and the second REG bundle. In some examples, the network node may be further configured to transmit the downlink transmission via the first REG bundle. In some examples, the network node may be further configured to transmit a reference signal for demodulating the first REG bundle via the first REG bundle and the second REG bundle.

Certain aspects are directed to a user equipment (UE). In some examples, the UE includes means for receiving, from a network node, communication parameters for a downlink transmission, the communication parameters indicative of a first resource element group (REG) bundle and a second REG bundle. In some examples, the UE includes means for receiving the downlink transmission via the first REG bundle. In some examples, the UE includes means for performing channel estimation of the downlink transmission based on reference signals transmitted over the first REG bundle and the second REG bundle.

Certain aspects are directed to a network node. In some examples, the network node includes means for determining a first superset of a plurality of supersets, wherein the first superset is uniquely mapped to at a first resource element group (REG) bundle and a second REG bundle. In some examples, the network node includes means for transmitting communication parameters for a downlink transmission, the communication parameters indicative of the first REG bundle and the second REG bundle. In some examples, the network node includes means for transmitting the downlink transmission via the first REG bundle. In some examples, the network node includes means for transmitting a reference signal for demodulating the first REG bundle via the first REG bundle and the second REG bundle.

Certain aspects are directed to a non-transitory computer-readable medium having instructions stored thereon that, when executed by a user equipment (UE), cause the UE to perform operations for wireless communication. In some examples, the operations include receiving, from a network node, communication parameters for a downlink transmission, the communication parameters indicative of a first resource element group (REG) bundle and a second REG bundle. In some examples, the operations include receiving the downlink transmission via the first REG bundle. In some examples, the operations include performing channel estimation of the downlink transmission based on reference signals transmitted over the first REG bundle and the second REG bundle.

Certain aspects are directed to a non-transitory computer-readable medium having instructions stored thereon that, when executed by a network node, cause the network node to perform operations for wireless communication. In some examples, the operations include determining a first superset of a plurality of supersets, wherein the first superset is uniquely mapped to at a first resource element group (REG) bundle and a second REG bundle. In some examples, the operations include transmitting communication parameters for a downlink transmission, the communication parameters indicative of the first REG bundle and the second REG bundle. In some examples, the operations include transmitting the downlink transmission via the first REG bundle. In some examples, the operations include transmitting a reference signal for demodulating the first REG bundle via the first REG bundle and the second REG bundle.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 6 is a block diagram illustrating an example of physical downlink control channel (PDCCH) candidates within a control-resource set (CORESET).

FIG. 13 is a flowchart of a method of wireless communication.

DETAILED DESCRIPTION

Figure 1:
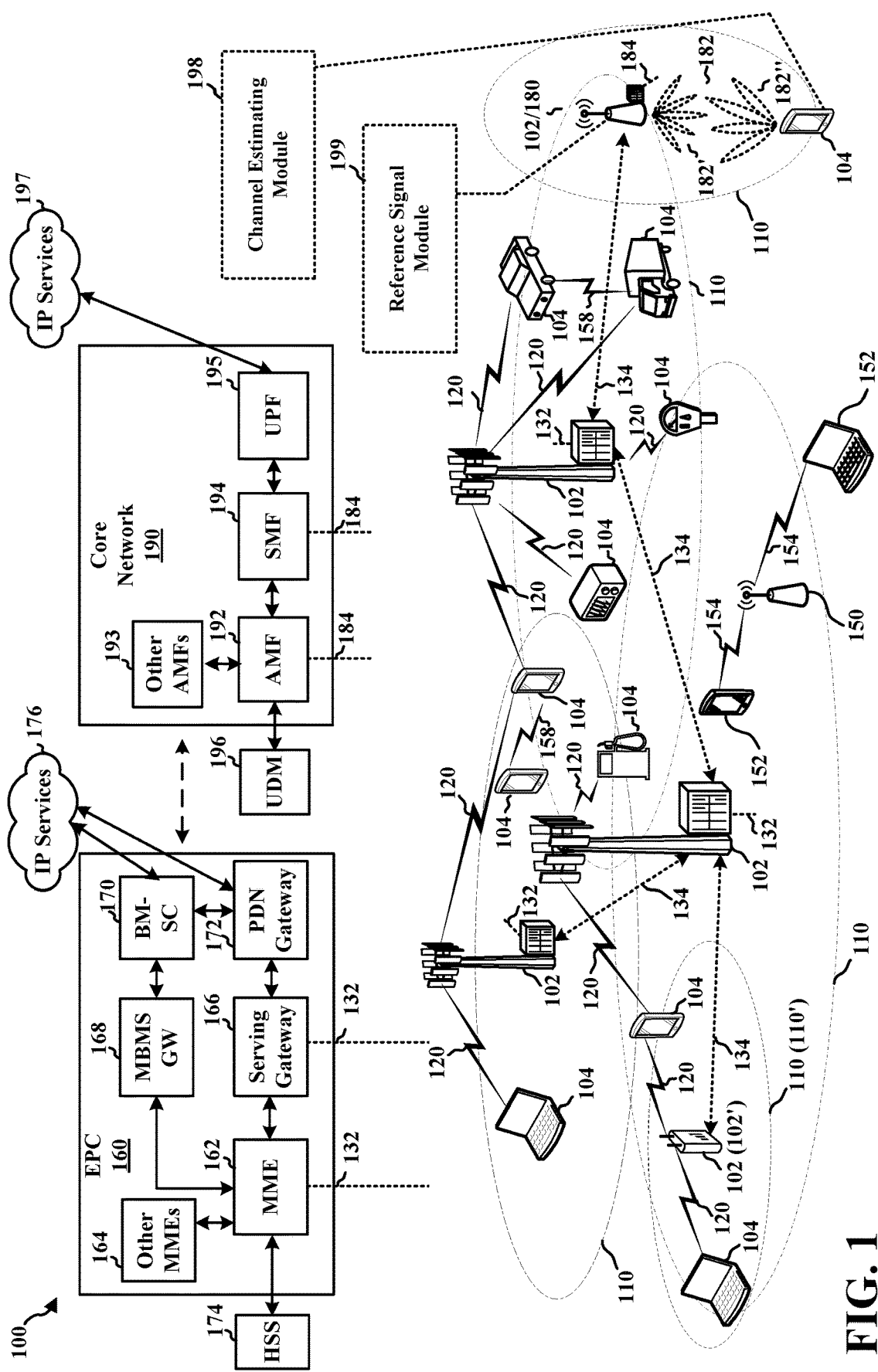
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, a demodulation reference signal (DMRS) may be specified for particular user equipment (UE), and used to estimate a radio channel used by the UE and a base station for communication. The DMRS may be used by a receiver for radio channel estimation for demodulation of a physical channel that carried the DMRS, for example, physical broadcast channel (PBCH), physical downlink control channel (PDCCH), physical downlink shared channel (PDSCH), physical uplink shared channel (PUSCH), etc.

The 3GPP specifications currently provide that if at least one resource element (RE) of a physical downlink control channel (PDCCH) candidate for a user equipment (UE) on a serving cell overlaps with at least one RE of ite-CRSToMatchAround, or of LTE-CRS-PatternList, the UE is not required to monitor the PDCCH candidate. In other words, the UE does not need to monitor the PDCCH if at least one of the PDCCH REs overlap with a common (cell-specific) reference signal (CRS). In some examples, the CRS pattern (e.g., or a set of CRS REs) may be configured by higher-layer signaling (e.g., radio resource control (RRC) signaling or medium access control (MAC) control element (CE) provides CRS pattern) or by physical (PHY) layer signaling (e.g., downlink control information (DCI)). Here, based on the higher-layer signaling, the UE may assume that the CRS is present in REs according to the signaling, although the CRS may not always be present in the REs (e.g., the base station may not always transmit CRS). Thus, in an example where the CRS is not transmitted with a downlink transmission, the downlink transmission may still be punctured by the CRS pattern. In an example where the CRS is transmitted with a downlink transmission, the downlink transmission may be punctured by, or rate-matched around, the CRS pattern.

Typically a PDCCH candidate may span 1-3 orthogonal frequency division multiplexing (OFDM) symbols. However, if an RE carries a CRS in one or more of those symbols, then those symbols are not expected to be a PDCCH candidate, and the UE will not monitor them. More specifically, the UE will not monitor those symbols for DMRS. In an example where a PDCCH candidate spans 3 symbols and the first two symbols carry CRS, the UE will only monitor the last symbol for PDCCH and DMRS. Here, because the PDCCH includes DMRS REs, channel estimation performance will be degraded because the PDCCH is only one symbol, resulting in low signal-to-noise ratio (SNR) of DMRS signals Even in a scenario where the PDCCH candidate is rate matched around the CRS REs of the first two symbols (e.g., the PDCCH candidate occupies symbols 1-3, and is rate matched around the CRS REs of the first two symbols). Still, in this scenario, the CRS pattern may interfere with the DMRS pattern of the PDCCH (e.g., the CRS pattern may puncture the DMRS pattern). In this example, because the PDCCH includes DMRS REs, and because the PDDCH is punctured around the CRS REs, channel estimation performance will also be degraded because the puncturing may eliminate DMRS REs.

Thus, in certain aspects, the disclosure is directed to techniques for transmitting reference signals over REG bundles that are part of the same superset as another REG bundle that is used to carry a downlink transmission. In this manner, the UE may monitor a broader spectrum of reference signals in order to improve channel estimation.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Figure 4:
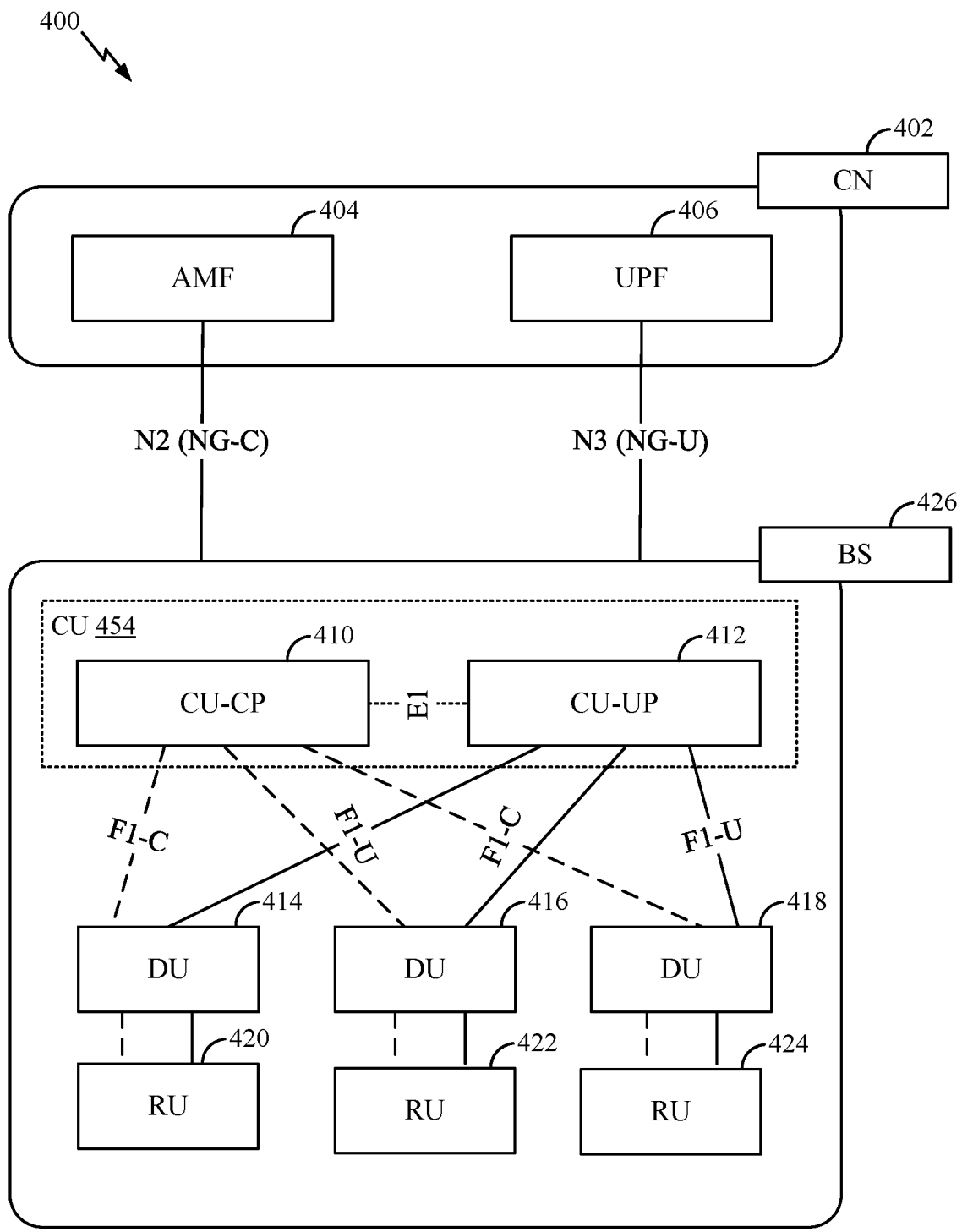
FIG. 4 illustrates an example monolithic (e.g., disaggregated) architecture of a distributed radio access network (RAN).
Figure 5:
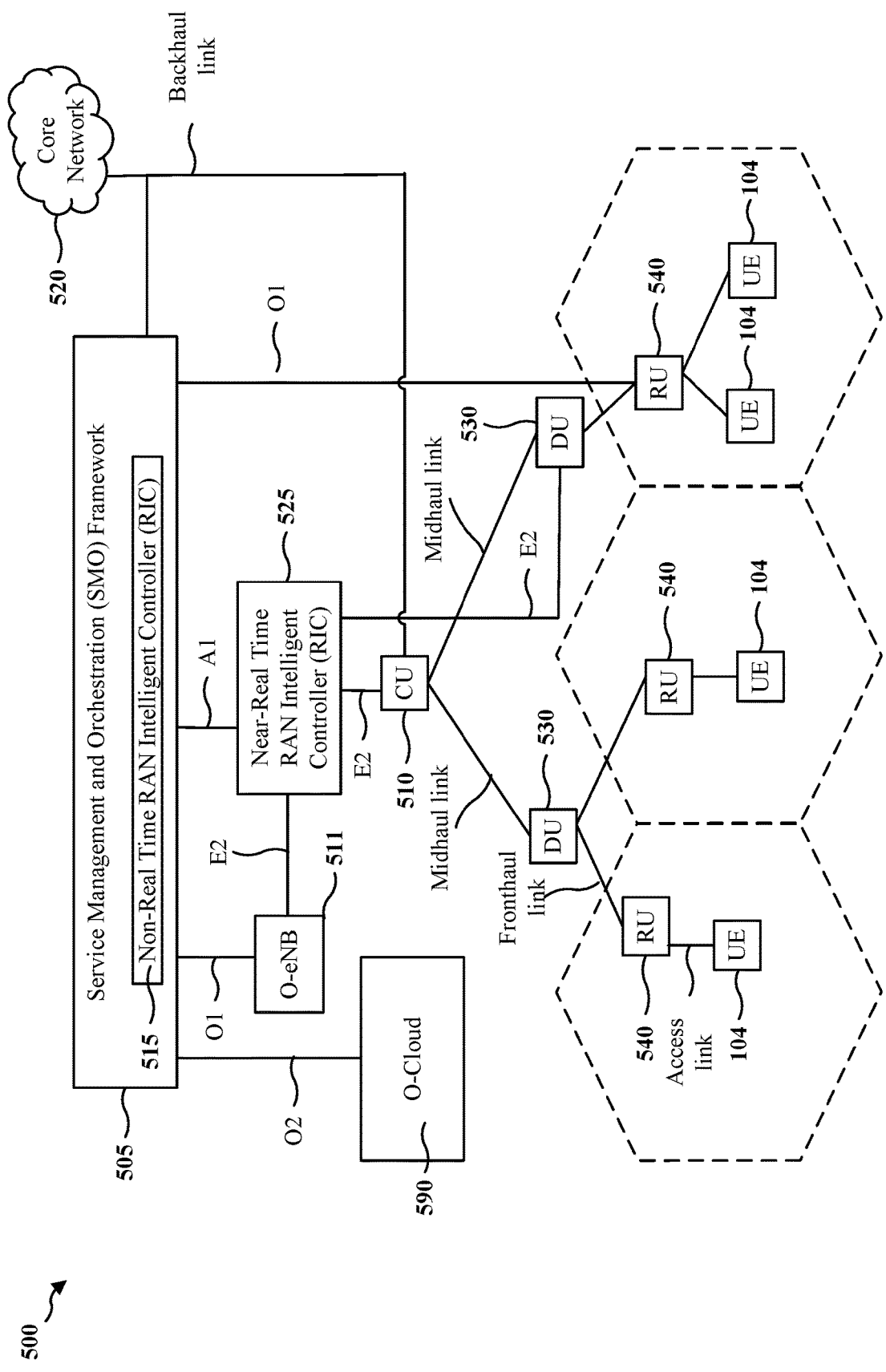
FIG. 5 is a block diagram illustrating an example disaggregated base station architecture.

Throughout the disclosure, a "network node" may be used to refer to a base station (e.g., an aggregated base station as illustrated in FIG. 4), or as a component of a base station such as one or more of a central unit (CU), a distributed unit (DU), a radio unit (RU), a near-real time (near-RT) radio access network (RAN) intelligent controller (RIC), or a non-real time (non-RT) RIC, illustrated in the disaggregated base station of FIG. 5.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a channel estimating module 198 configured to receive, from a network node, communication parameters for a downlink transmission, the communication parameters indicative of a first resource element group (REG) bundle and a second REG bundle; receive the downlink transmission via the first REG bundle; and perform channel estimation of the downlink transmission based on reference signals transmitted over the first REG bundle and the second REG bundle.

Referring again to FIG. 1, in certain aspects, the base station 102/180 may include a reference signal module 199 be configured to determine a first superset of a plurality of supersets, wherein the first superset is uniquely mapped to at a first resource element group (REG) bundle and a second REG bundle; transmit communication parameters for a downlink transmission, the communication parameters indicative of the first REG bundle and the second REG bundle; transmit the downlink transmission via the first REG bundle; and transmit a reference signal for demodulating the first REG bundle via the first REG bundle and the second REG bundle.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies id 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology ii, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry one or more reference (pilot) signals (RS) for the UE. As illustrated, REs in symbols 0, 1, 4, 7, 8, and 11 carry a cell reference signal (CRS) for channel estimation at the UE. The REs may also carry a demodulation RS (DM-RS) (indicated as $R_x$ for one particular configuration, where $100x$ is the port number, but other DM-RS configurations are possible). In some examples, one or more REs may carry channel state information reference signals (CSI-RS) instead of CRS for channel estimation at the UE. The RS may also include beam measurement RS (BRS), beam refinement RS (BRRS), and phase tracking RS (PT-RS).

In the case of a downlink slot, one or more of the first three symbols (e.g., symbols 0-2) may be used for PDCCH, according to parameters configured for information elements (IEs) SearchSpace and/or conrolResourceSet. In a downlink communication where CRS is transmitted with 4 ports, the CRS REs may be carried on OFDM symbols 0, 1, 4, 7, 8, and 11. As noted above, if at least one RE of a PDCCH candidate for a UE on the serving cell overlaps with at least one RE configured to carry a CRS, the UE is not required to monitor the PDCCH. In a scenario where the PDCCH is monitored within symbols 0-2, the UE may only monitor symbol 2 for the PDCCH. However, PDCCH only on one symbol of a slot may be too restrictive in terms of PDCCH capacity.

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RB s in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
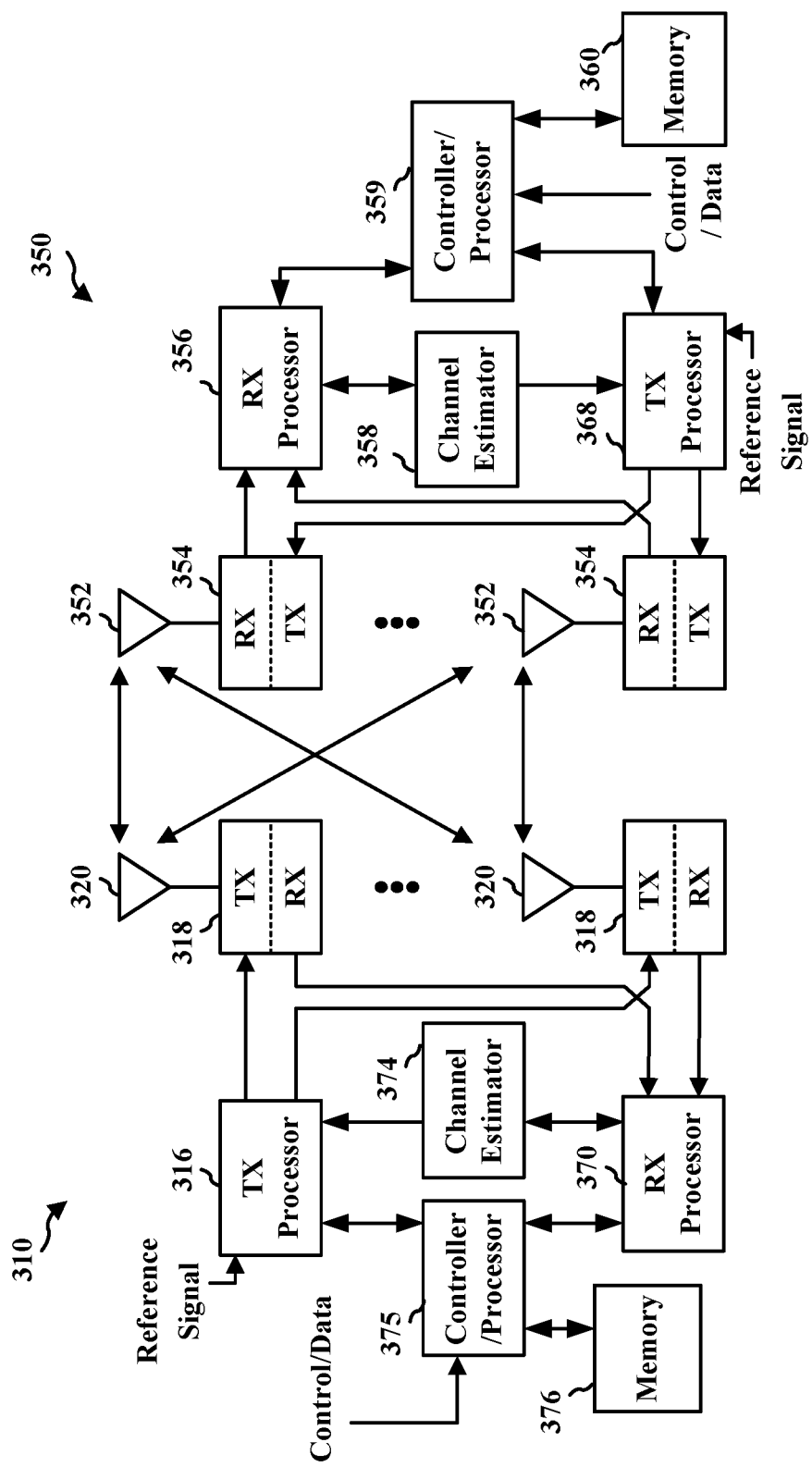
FIG. 3 is a diagram illustrating an example of a base station and user equipment (UE) in an access network.

FIG. 3 is a block diagram of a base station 310 (e.g., base station 102/180 of FIG. 1) in communication with a UE 350 (e.g., UE 104 of FIG. 1) in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TB s, demultiplexing of MAC SDUs from TB s, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

FIG. 4 illustrates an example monolithic (e.g., disaggregated) architecture of a distributed RAN 400, which may be implemented in the wireless communications system and an access network 100 illustrated in FIG. 1. As illustrated, the distributed RAN 400 includes core network (CN) 402 and a base station 426.

The CN 402 may host core network functions. CN 402 may be centrally deployed. CN 402 functionality may be offloaded (e.g., to advanced wireless services (AWS)), in an effort to handle peak capacity. The CN 402 may include an AMF 404 and a UPF 406. The AMF 404 and UPF 406 may perform one or more of the core network functions.

The base station 426 may communicate with the CN 402 (e.g., via a backhaul interface). The base station 426 may communicate with the AMF 404 via an N2 (e.g., NG-C) interface. The base station 426 may communicate with the UPF 406 via an N3 (e.g., NG-U) interface. The base station 426 may include a central unit-control plane (CU-CP) 410, one or more central unit-user planes (CU-UPs) 412, one or more distributed units (DUs) 414-418, and one or more radio units (RUs) 420-424.

The CU-CP 410 may be connected to one or more of the DUs 414-418. The CU-CP 410 and DUs 414-418 may be connected via a F1-C interface. As shown in FIG. 4, the CU-CP 410 may be connected to multiple DUs, but the DUs may be connected to only one CU-CP. Although FIG. 4 only illustrates one CU-UP 412, the base station 426 may include multiple CU-UPs. The CU-CP 410 selects the appropriate CU-UP(s) for requested services (e.g., for a UE). The CU-UP(s) 412 may be connected to the CU-CP 410. For example, the CU-UP(s) 412 and the CU-CP 410 may be connected via an E1 interface. The CU-UP(s) 412 may be connected to one or more of the DUs 414-418. The CU-UP(s) 412 and DUs 414-418 may be connected via a F1-U interface. As shown in FIG. 4, the CU-CP 410 may be connected to multiple CU-UPs, but the CU-UPs may be connected to only one CU-CP 410.

A DU, such as DUs 414, 416, and/or 418, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 414-416 may be connected with one of RUs 420/422/424.

The CU-CP 410 may be connected to multiple DU(s) that are connected to (e.g., under control of) the same CU-UP 412. Connectivity between a CU-UP 412 and a DU may be established by the CU-CP 410. For example, the connectivity between the CU-UP 412 and a DU may be established using bearer context management functions. Data forwarding between CU-UP(s) 412 may be via a Xn-U interface.

The distributed RAN 400 may support fronthauling solutions across different deployment types. For example, the RAN 400 architecture may be based on transmit network capabilities (e.g., bandwidth, latency, and/or jitter). The distributed RAN 400 may share features and/or components with LTE. For example, the base station 426 may support dual connectivity with NR and may share a common fronthaul for LTE and NR. The distributed RAN 400 may enable cooperation between and among DUs 414-418, for example, via the CU-CP 412. An inter-DU interface may not be used. Logical functions may be dynamically distributed in the distributed RAN 400.

FIG. 5 is a block diagram illustrating an example disaggregated base station 500 architecture. The disaggregated base station 500 architecture may include one or more CUs 510 that can communicate directly with a core network 520 via a backhaul link, or indirectly with the core network 520 through one or more disaggregated base station units (such as a near real-time (RT) RIC 525 via an E2 link, or a non-RT RIC 515 associated with a service management and orchestration (SMO) Framework 505, or both). A CU 510 may communicate with one or more DUs 530 via respective midhaul links, such as an F1 interface. The DUs 530 may communicate with one or more RUs 540 via respective fronthaul links. The RUs 540 may communicate with respective UEs 104 via one or more radio frequency (RF) access links. In some implementations, the UE 104 may be simultaneously served by multiple RUs 540.

Each of the units, i.e., the CUs 510, the DUs 530, the RUs 540, as well as the near-RT RICs 525, the non-RT RICs 515 and the SMO framework 505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 510 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 510. The CU 510 may be configured to handle user plane functionality (i.e., central unit—user plane (CU-UP)), control plane functionality (i.e., central unit—control plane (CU-CP)), or a combination thereof. In some implementations, the CU 510 can be logically split into one or more CU-UP units and one or more CU-CP units. The CU-UP unit can communicate bidirectionally with the CU-CP unit via an interface, such as the E1 interface when implemented in an O-RAN configuration. The CU 510 can be implemented to communicate with the DU 530, as necessary, for network control and signaling.

The DU 530 may correspond to a logical unit that includes one or more base station functions to control the operation of one or more RUs 540. In some aspects, the DU 530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 530 may further host one or more low PHY layers. Each layer (or module) can be implemented with an interface configured to communicate signals with other layers (and modules) hosted by the DU 530, or with the control functions hosted by the CU 510.

Lower-layer functionality can be implemented by one or more RUs 540. In some deployments, an RU 540, controlled by a DU 530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 540 can be implemented to handle over the air (OTA) communication with one or more UEs 104. In some implementations, real-time and non-real-time aspects of control and user plane communication with the RU(s) 540 can be controlled by the corresponding DU 530. In some scenarios, this configuration can enable the DU(s) 530 and the CU 510 to be implemented in a cloud-based RAN architecture, such as a virtual RAN (vRAN) architecture.

The SMO Framework 505 may be configured to support RAN deployment and provisioning of non-virtualized and virtualized network elements. For non-virtualized network elements, the SMO framework 505 may be configured to support the deployment of dedicated physical resources for RAN coverage requirements, which may be managed via an operations and maintenance interface (such as an O1 interface). For virtualized network elements, the SMO framework 505 may be configured to interact with a cloud computing platform (such as an open cloud (O-cloud) 590) to perform network element life cycle management (such as to instantiate virtualized network elements) via a cloud computing platform interface (such as an O2 interface). Such virtualized network elements can include, but are not limited to, CUs 510, DUs 530, RUs 540 and near-RT RICs 525. In some implementations, the SMO framework 505 can communicate with a hardware aspect of a 4G RAN, such as an open eNB (O-eNB) 511, via an O1 interface. Additionally, in some implementations, the SMO Framework 505 can communicate directly with one or more RUs 540 via an O1 interface. The SMO framework 505 also may include the non-RT RIC 515 configured to support functionality of the SMO Framework 505.

The non-RT RIC 515 may be configured to include a logical function that enables non-real-time control and optimization of RAN elements and resources, artificial intelligence/machine learning (AI/ML) workflows including model training and updates, or policy-based guidance of applications/features in the near-RT RIC 525. The non-RT RIC 515 may be coupled to or communicate with (such as via an A1 interface) the near-RT RIC 525. The near-RT RIC 525 may be configured to include a logical function that enables near-real-time control and optimization of RAN elements and resources via data collection and actions over an interface (such as via an E2 interface) connecting one or more CUs 510, one or more DUs 530, or both, as well as an O-eNB, with the near-RT RIC 525.

In some implementations, to generate AI/ML models to be deployed in the near-RT RIC 525, the non-RT RIC 515 may receive parameters or external enrichment information from external servers. Such information may be utilized by the near-RT RIC 525 and may be received at the SMO Framework 505 or the non-RT RIC 515 from non-network data sources or from network functions. In some examples, the non-RT RIC 515 or the near-RT RIC 525 may be configured to tune RAN behavior or performance. For example, the non-RT RIC 515 may monitor long-term trends and patterns for performance and employ AI/ML models to perform corrective actions through the SMO Framework 505 (such as reconfiguration via O1) or via creation of RAN management policies (such as A1 policies).

Example Techniques for Channel Estimation Using Supersets

FIG. 6 is a block diagram illustrating an example of a PDCCH candidate within a control-resource set (CORESET) 602. The CORESET 602 is a set of physical resources (e.g., time and frequency resources) used to carry PDCCH and/or DCI. Here, the CORESET 602 spans two symbols (e.g., symbols 1 and 2) and 96 resource blocks (RBs). The CORESET 602 includes a PDCCH candidate 604 with aggregation level 4 (e.g., consisting of four control channel elements (CCEs) where each CCE consists of six REGs) that also spans the two symbols, and includes twenty-four resource element groups (REGs), (e.g., twelve REGs on each symbol) in two discontinuous resources in frequency domain within the CORESET. The PDCCH candidate 604 also includes twelve REG bundles 606a-606l (also referred to at REG bundles 606) wherein each of the REG bundles 606 is made up of two symbol-adjacent REGs. As illustrated, each REG bundle 606 is distinguished by a hatch pattern.

It should be noted that a base station (e.g., base station 102/180 of FIG. 1) may configure a UE (e.g., UE 104 of FIG. 1) with the CORESET 602 parameters (e.g., ControlResourceSet), and the PDCCH candidate 604 parameters (e.g., cce-REG-MappingType: REG bundle size, aggregation level (e.g., AL-4), non-interleaved or interleaved CCE-to-REG mapping, shift index, etc.) via radio resource control (RRC) messaging.

As discussed above, a UE may refrain from monitoring one or more symbols of the PDCCH candidate 604 if the UE is configured with LTE-CRS patterns indicating that those symbols carry CRS. In the illustrated example, if symbols 0 and 1 are considered to carry CRS, then the UE may not monitor PDCCH candidate 604. However, as described herein, the base station may puncture one or more REs of the candidate PDCCH with a CRS RE or rate-match the candidate PDCCH around the CRS RE.

Conventionally, a precoder granularity is determined based on the size of the REG bundle. That is, the DMRS for the REG bundle is mapped in the REG bundle for all OFDM symbols for the PDCCH. However, as discussed above, such precoder granularity may result in degraded channel estimation performance (e.g., a DRMS signal of PDCCH candidate RE may be eliminated if the PDCCH candidate is punctured by CRS). In one example, a UE may not even monitor a PDCCH candidate if even one symbol of the PDCCH candidate includes a CRS RE. Even if the UE were to monitor only the one or more symbols (e.g., symbol 2 of FIG. 2A) of the PDCCH candidate (e.g., symbols 0-2) that do not include a CRS RE, channel estimation performance may be degraded because of the relatively small number of DMRS signals (e.g., DMRS signals received on only one symbol instead of three).

Thus, in certain aspects, the precoder granularity may be expanded to include one or more additional REG bundles that are consecutive (e.g., contiguous) in the frequency domain, forming a "superset" of REG bundles. That is, the UE may assume that the precoder is the same over the superset. As such, the DMRS for a REG bundle may be mapped in a superset of a particular OFDM symbol of the PDCCH candidate 604 for enhancing the performance of channel estimation.

Figure 7A:
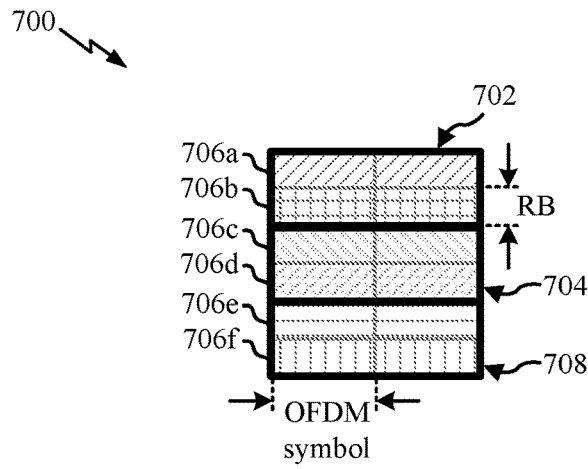
FIGS. 7A-7C are block diagrams illustrating example implementations of superset REG bundles of a PDCCH candidate, using the same PDCCH candidate size and hatch pattern associated with each REG bundle as illustrated in FIG. 6.
Figure 7B:
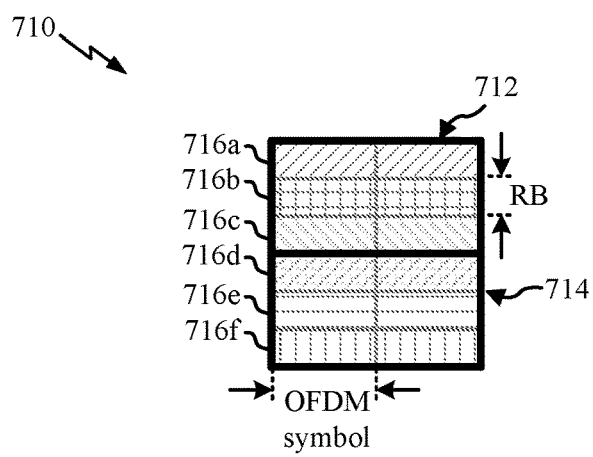
Figure 7C:
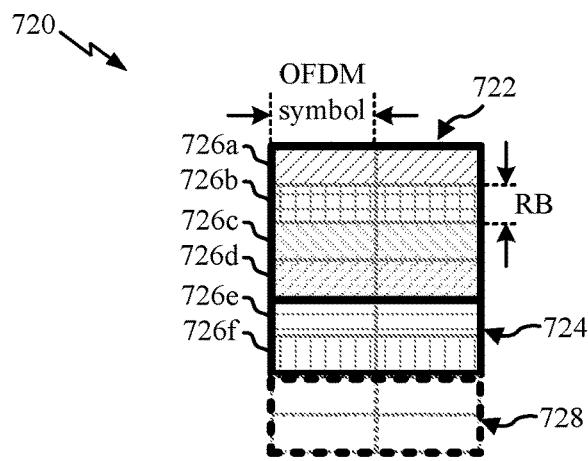

FIGS. 7A-7C are block diagrams illustrating example implementations of superset REG bundles of a PDCCH candidate, using the same PDCCH candidate size and hatch pattern associated with each REG bundle as illustrated in FIG. 6. Further, it is appreciated that the disclosure is not limited to the examples provided in FIGS. 7A-7C, and that differently sized supersets may be used with differently sized PDCCH candidates, or one or more supersets that each include resources of multiple PDCCH candidates.

A base station (e.g., base station 102/180 of FIG. 1) may configure a UE (e.g., UE 104 of FIG. 1) with superset parameters via RRC signaling. For example, the existing parameter for precoder granularity (e.g., precoderGranularity of ControlResourceSet) may be repurposed to provide the UE with an indication of the size of one or more supersets. In another example, a new parameter may be added to the ControlResourceSet IE (or another suitable IE) to provide the UE with an indication of the size of one or more supersets. In some examples, the base station may configure the UE with a table of multiple superset sizes and/or configurations, with each size and/or configuration identified by an index value. Thus, the indication of the size of one or more supersets may be provided via an index value. Superset with index i may cover RBs [(i)(L)+n], [(i)(L)+n+1], . . . , [(i)(L)+n+L−1], where L is the superset size (e.g., in terms of REGs or REG bundles) and n is a cyclic shift or offset. The value of n may be fixed to 0 or can be configured by RRC.

FIG. 7A illustrates a first superset implementation 700 wherein each superset includes 2 REG bundles. Here, 6 REG bundles (e.g., 706a-706f, collectively referred to as REG bundles 706) are illustrated. Instead of setting the precoder granularity to equal the size of the REG bundle (which occupies one RB over each of two symbols), the base station may configure the UE with a precoder granularity equal to the first superset implementation where the superset contains two REG bundles (e.g., 4 REGs, 2 REG bundles). Here, a first superset 702 includes the first REG bundle 706*a* and the second REG bundle 706*b*; a second superset 704 include the third REG bundle 706*c* and the fourth REG bundle 706*d*; and a third superset 708 includes the fifth REG bundle 706*e* and the sixth REG bundle 706*f*. It should be noted that, depending on an interleaver configuration, the 6 REG bundles 706 may correspond to the same PDCCH candidate, or may be spread across multiple PDCCH candidates (e.g., different PDCCH candidates for the same UE, or PDCCH candidates for different UEs).

FIG. 7B illustrates a second superset implementation 710 wherein the superset includes 3 REG bundles. Here, 6 REG bundles (e.g., 716*a*-716*f*, collectively referred to as 716) are illustrated. The base station may configure the UE with a precoder granularity equal to the second superset implementation where the superset contains three REG bundles (e.g., 6 REGs, 3 REG bundles). Here, a first superset 712 includes the first REG bundle 716*a*, the second REG bundle 716*b*, and the third REG bundle 716*c*; and a second superset 714 include the fourth REG bundle 716*d*, the fifth REG bundle 716*e*, and the sixth REG bundle 716*f*. It should be noted that, depending on an interleaver configuration, the 6 REG bundles 716 may correspond to the same PDCCH candidate, or may be spread across multiple PDCCH candidates (e.g., different PDCCH candidates for the UE, or PDCCH candidates for different UEs).

FIG. 7C illustrates a third superset implementation 720 wherein a first superset 722 includes 4 REG bundles and a second superset 724 includes two REG bundles. Here, 6 REG bundles (e.g., 726*a*-726*f*, collectively referred to as 726) are illustrated. Here, the first superset 722 includes the first REG bundle 726*a*, the second REG bundle 726*b*, the third REG bundle 726*c*, and the fourth REG bundle 726*d*; and the second superset 724 includes the fifth REG bundle 726*e* and the sixth REG bundle 726*f*.

Still referring to FIG. 7C, in some examples, the base station may configure the UE with two separate precoder granularities, wherein a first precoder granularity is equal to the first superset 722 (e.g., 8 REGs, 4 REG bundles) and a second precoder granularity is equal the second superset 724 (e.g., four REGs, two REG bundles). In another example, the base station may configure the UE to use one superset (e.g., index i) and the UE may determine to bound the first superset and/or the last superset for a PDCCH candidate if the PDCCH candidate has a smaller number of RB s than L. For example, in FIG. 7C, the base station may configure the UE to use a superset corresponding to index i that includes four REG bundles. However, because the size of the PDCCH candidate is only 6 REG bundles, the UE may automatically reduce the first/last superset to two REG bundles.

However, in some examples, the base station may transmit DMRS signals in REG bundles outside of a superset. That is, if the superset is sized as illustrated in FIG. 7C, wherein the second superset 724 only corresponds to two REG bundles despite being sized for four REG bundles, the UE may monitor adjacent REG bundles 728 to receive DMRS signals transmitted outside of the second superset 724. Thus, the combination of the second superset 724 and the adjacent REG bundles 728 may provide the UE with the correct precoder granularity (e.g., where the UE is only configured with a superset size equal to the first precoder granularity). It should be noted that, depending on an interleaver configuration, the 6 REG bundles 726 may correspond to the same PDCCH candidate, or may be spread across multiple PDCCH candidates (e.g., different PDCCH candidates for the UE, or PDCCH candidates for different UEs).

Figure 8:
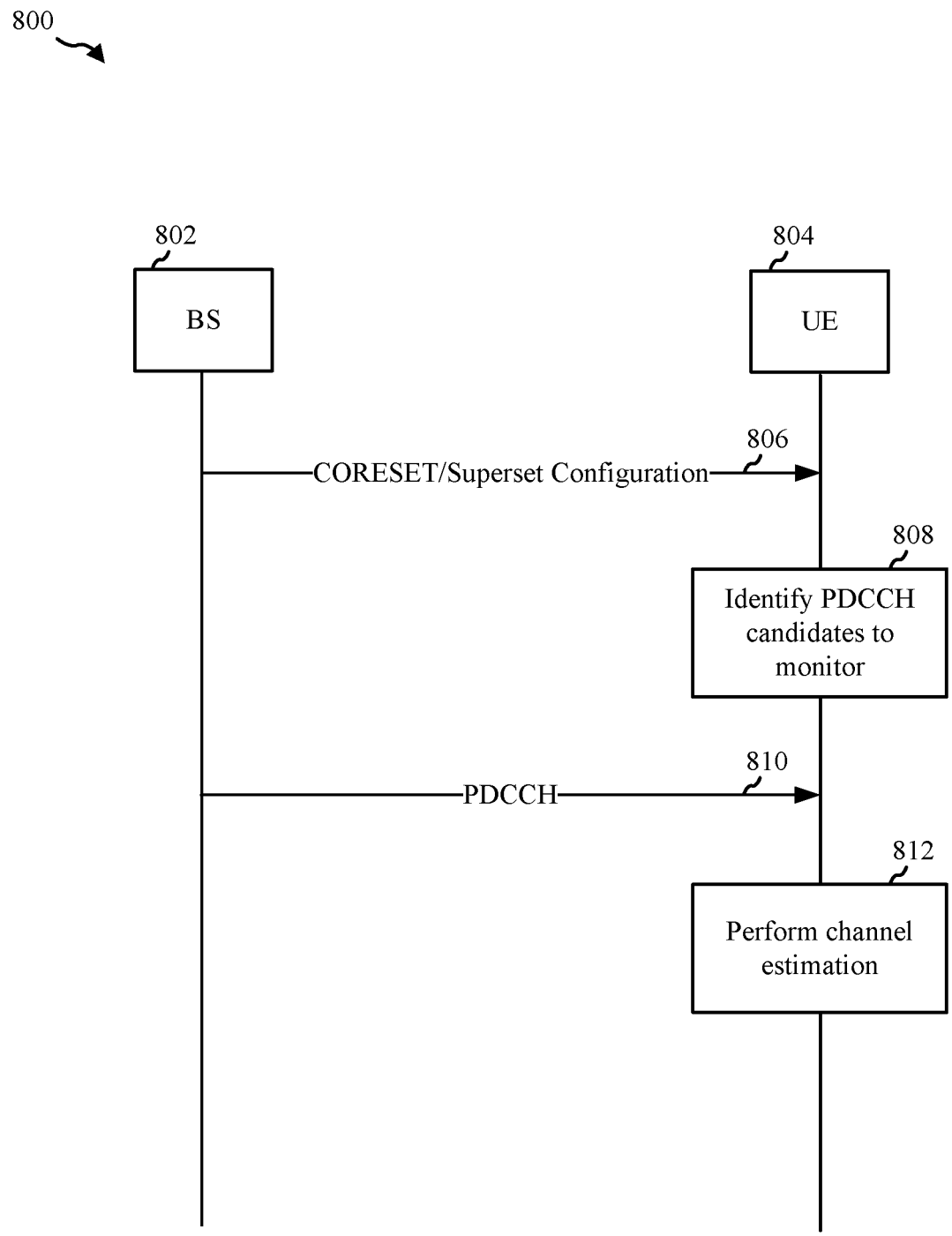
FIG. 8 is a call-flow diagram illustrating example communications between a base station and a UE.

FIG. 8 is a call-flow diagram 800 illustrating example communications between a base station 802 (e.g., base station 102/180 of FIG. 1) and a UE 804 (e.g., UE 104 of FIG. 1). The communications may include one or more downlink transmissions using the PDCCH candidates within CORESET 602 of FIG. 6.

At a first communication 806, the base station 802 may transmit, via RRC signaling, a CORESET configuration, a search space configuration, and optionally, a superset configuration that includes one or more parameters not provided in the CORESET configuration. In other words, the UE 804 may receive communication parameters for downlink transmissions (e.g., candidate PDCCH), wherein the communication parameters are indicative of at least a first REG bundle and a second REG bundle. For example, based on the RRC signaling, the UE 804 may identify a CORESET location, including one or more of an REG bundle grid, a superset grid, and a mapping of CRS REs. Referring to FIG. 7B as an example, the UE 804 may determine to monitor the fifth REG bundle 716*e* and the sixth REG bundle 716*f* for downlink transmissions.

In some examples, the communication parameters may include a control channel element (CCE)-to-REG mapping, indicating one or more REG bundles for the UE 804 to monitor for downlink transmissions. In one example, the communication parameters include an indication of a superset configuration mapping the first REG bundle and the second REG bundle to a first superset wherein the first REG bundle and the second REG bundle share the same precoder. The communication parameters may also include an indication of a second superset mapped to at least a third REG bundle. That is, the first superset and the second superset may be uniquely mapped to REG bundles not shared by the supersets. In some examples, the first superset and the second superset may correspond to the same precoder, or each of the first superset and the second superset may correspond to a unique precoder. That is, one superset may map to more REG bundles than the second superset.

At a first process 808, the UE 804 may identify a candidate PDCCH including one or more REG bundles to monitor for control signaling. In some examples, the UE 804 may identify the candidate PDCCH by identifying corresponding CCEs and one or more REG bundles associated with each CCE based on the communication parameters received from the first communication 806. In some examples, the communication parameters may include a PDCCH search space that indicates one or more CCE locations where the UE 804 may find its PDCCHs. In some examples, each CCE may include one or more REG bundles.

At a second communication 810, the base station 802 may transmit a PDCCH to the UE 804 via one or more REG bundles the UE 804 is monitoring for control signaling. Referring again to the example of FIG. 7B, the UE 804 may determine to monitor the fifth REG bundle 716*e* and the sixth REG bundle 716*f* for the downlink transmission based on the communication parameters (e.g., based on CCE-to-REG mapping). Once the UE 804 receives the downlink transmission via one or both of the fifth REG bundle 716*e* and/or the sixth REG bundle 716*f*, the UE 804 may determine that the second superset 714 corresponds to the fifth and sixth REG bundles 716*e*/716*f* in response to receiving the downlink transmission (e.g., the PDCCH may be received over only one or both of the REG bundles). Alternatively, the UE 804 may have already determined the corresponding superset(s) prior to receiving the downlink transmission.

It should be noted that the PDCCH transmitted at the second communication 810 may be punctured by a CRS pattern that is also transmitted via the fifth REG bundle 716e and the sixth REG bundle 716f.

At a second process 812, the UE 804 may perform channel estimation of the downlink transmission of the second communication 810 based on reference signals (e.g., DMRS signals) transmitted over one or both of the fifth REG bundle 716e and/or the sixth REG bundle 716f. For example, if the UE 804 receives the downlink transmission via the fifth REG bundle 716e, then the UE 804 may assume that the reference signals for channel estimation are present on all the REG-bundles within the second superset 714, and the same precoder is applied to all of them. That is, the UE 804 may receive DMRS from the fourth REG bundle 716d, the fifth REG bundle 716e, and the sixth REG bundle 716f while also receiving the downlink transmission from the fifth REG bundle 716e.

The UE 804 may then perform channel estimation for the downlink transmission using the reference signals received from all the REG bundles of the second superset 714. That is, the UE 804 may perform channel estimation using reference signals from REG bundles that did not include the downlink transmission but are associated with the same superset. The UE may then demodulate the downlink transmission received via the fifth REG bundle 714e based on the channel estimation of the reference signals received over each REG bundle of the second superset 714. It should be noted that if the UE 804 later receives another downlink transmission from the base station 802 via the sixth REG bundle 716f or the fourth REG bundle 716d, the UE 804 may determine not to perform the channel estimation again. In other words, the UE 804 may determine not to perform multiple channel estimations for different REG bundles within the same superset, and may instead demodulate the other downlink transmission based on the previous channel estimation.

Figure 9:
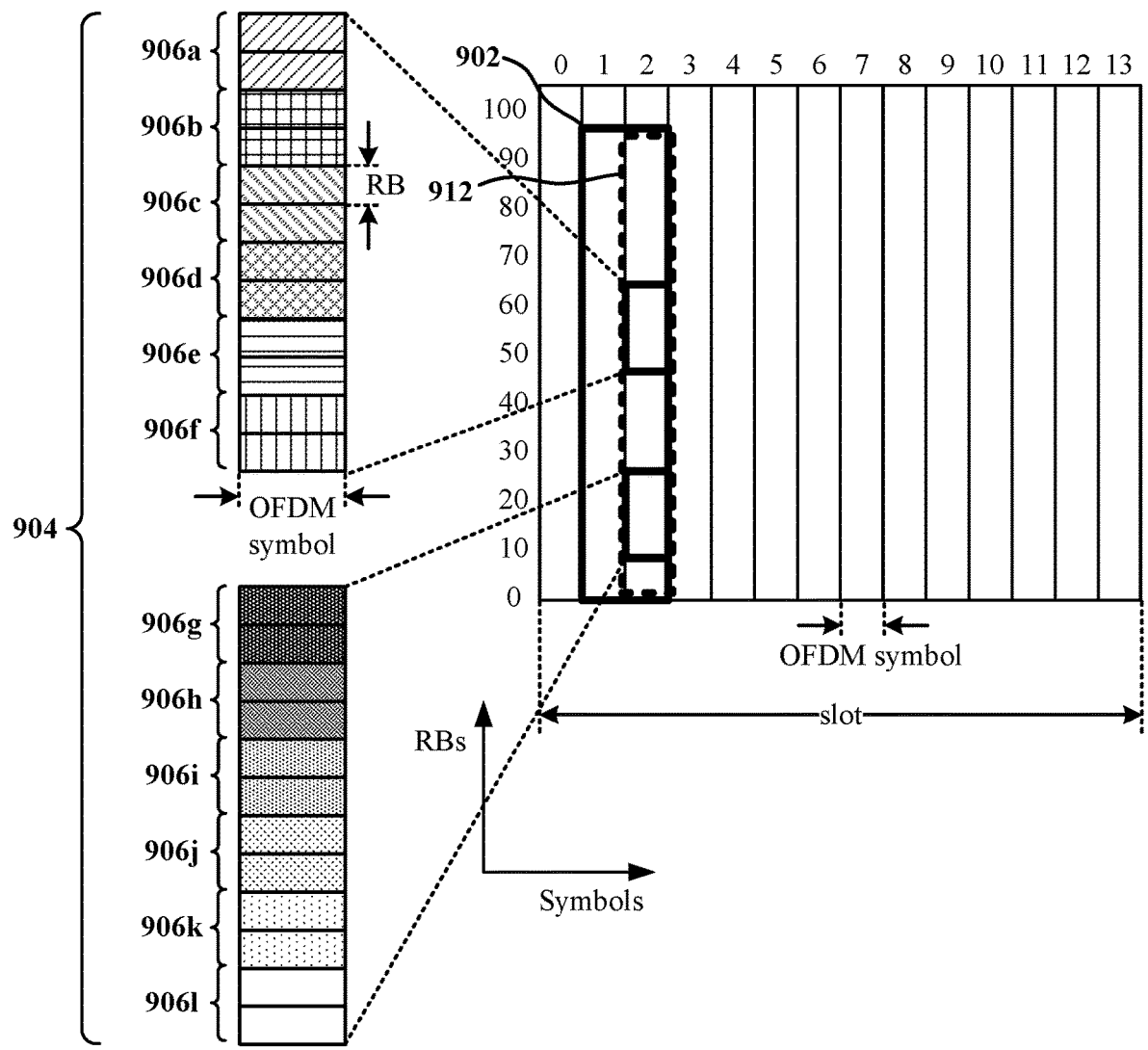
FIG. 9 is a block diagram illustrating an example of PDCCH candidates within a CORESET and a virtual CORESET.

FIG. 9 is a block diagram illustrating an example of a PDCCH candidate within a CORESET 902 and a virtual CORESET 912. Here, the CORESET 902 spans two symbols (e.g., symbols 1 and 2) and 96 resource blocks (RBs), and the virtual CORESET 912 is only one symbol (symbol 2). The CORESET 902 includes a PDCCH candidate 904 that occupies only symbol 2, and includes twenty-four REGs. The PDCCH candidate 904 also includes twelve REG bundles 906a-906l (collectively referred to at REG bundles 906) wherein each of the REG bundles 906 is made up of two frequency-adjacent REGs. As illustrated, each REG bundle 906 is distinguished by a hatch pattern. A superset may include two or more REG bundles 906 within symbol 2 and may also extend into adjacent frequency resources in symbol 1.

Figure 10:
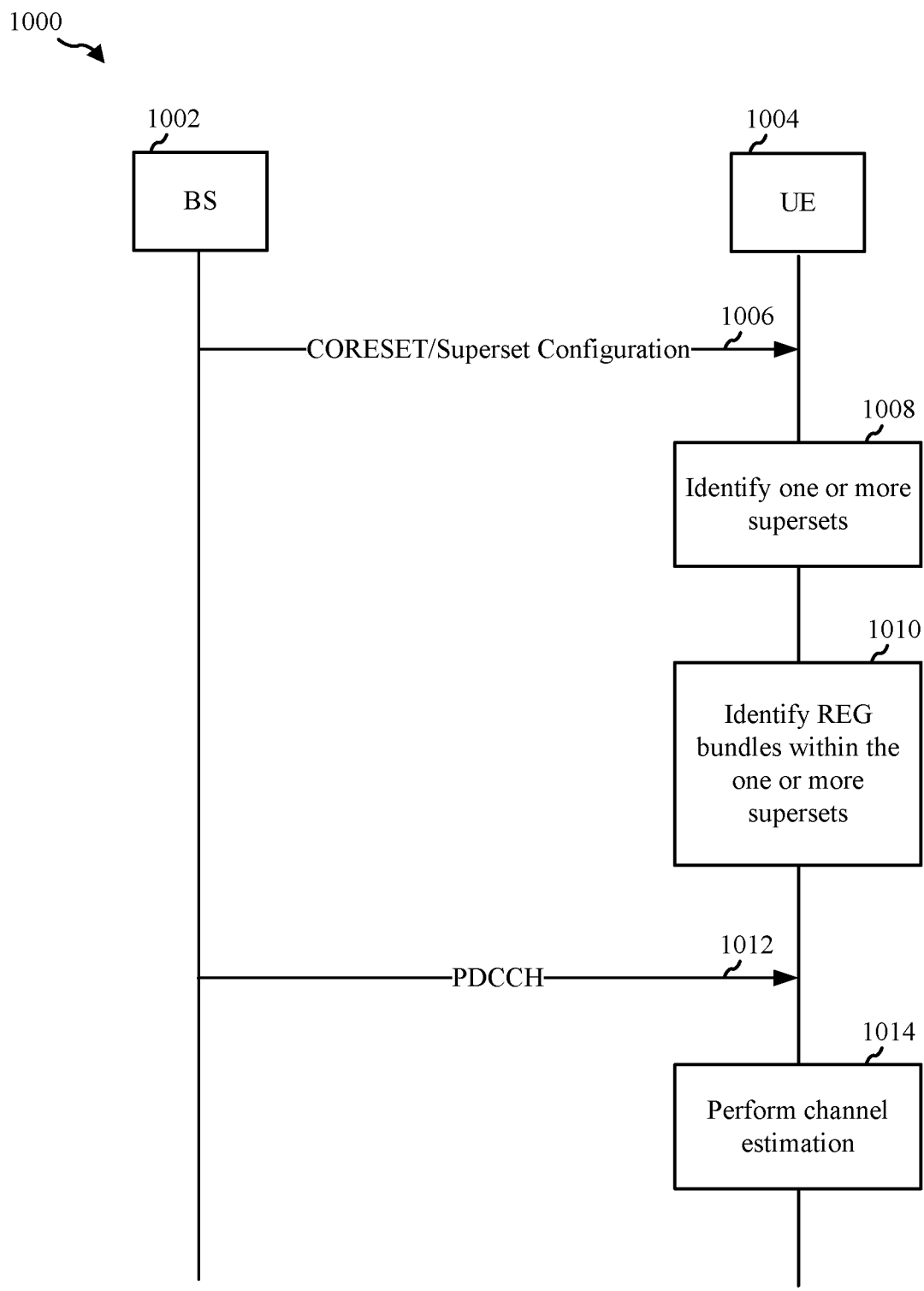
FIG. 10 is a call-flow diagram illustrating example communications between a base station and a UE.

FIG. 10 is a call-flow diagram 1000 illustrating example communications between a base station 1002 (e.g., base station 102/180 of FIG. 1) and a UE 1004 (e.g., UE 104 of FIG. 1). The communications may include one or more downlink transmissions using the PDCCH candidates within CORESET 902 and virtual CORESET 912 of FIG. 9.

At a first communication 1006, the base station 1002 may transmit, via RRC signaling, a CORESET configuration, a search space configuration, and one or more parameters indicating a virtual CORESET.

At a first process 1008, the UE 804 may identify one or more supersets based on the virtual CORESET. For example, the virtual CORESET may be configured such that it bounds the resources that may be used as REG bundles for receiving downlink transmissions. The UE 1004 may determine the supersets based on one or more rules. For example, a superset may include 2RBs or 6 RMs in a single OFDM symbol as if it is a REG bundle of a 1-symbol CORESET. In some examples, existing RRC parameters may be repurposed to identify the superset(s). For example, the UE 1004 may use the one or more parameters indicating the virtual CORESET to identify virtual CCE(s) associated with the virtual CORESET. Using the virtual CCE(s), the UE 1004 may identify virtual REG-bundle(s) to process as superset(s).

Once the supersets are identified, the UE 1004 may determine the REG bundles within the supersets at a second process 1010. That is, the UE 1004 may assume that the same precoder is applied to reference signals (e.g., DMRS) transmitted by the base station 1002 in all REGs of an identified superset.

At a second communication 1012, the UE 1004 may receive a downlink transmission (e.g., PDCCH) from the base station 1002. For example, the downlink transmission my be transmitted over one or more REG bundles of an identified superset. At a third process 1014, the UE 1004 may perform channel estimation based on the reference signals (e.g., DMRS) received by the UE 1004 from the base station 1002 via all the REGs in the superset. The UE 1004 may demodulate the signal based on the channel estimation.

Figure 11:
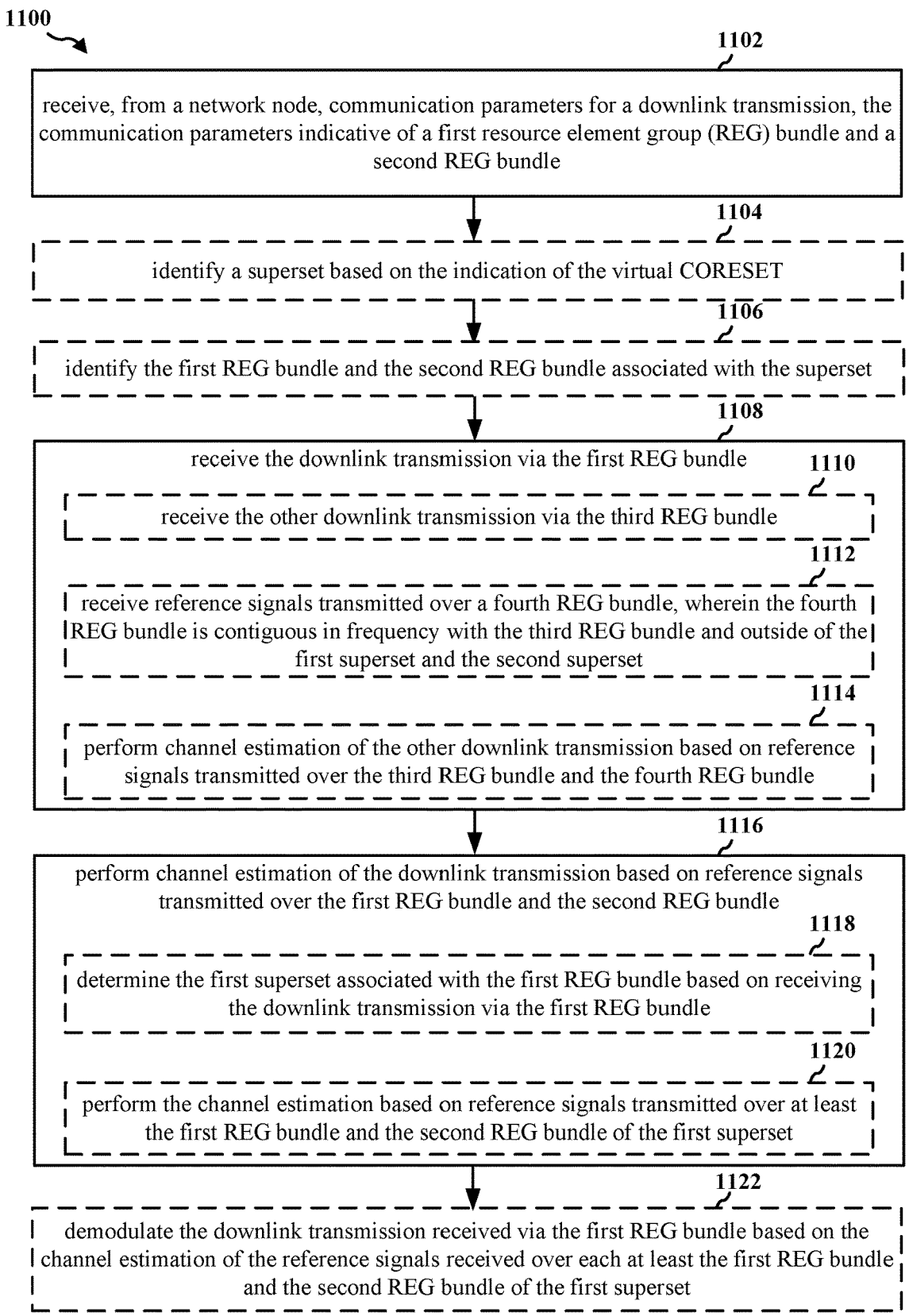
FIG. 11 is a flowchart of a method of wireless communication.

FIG. 11 is a flowchart 1100 of a method of wireless communication. The method may be performed by a UE (e.g., the UE 104 of FIG. 1; the apparatus 1202 of FIG. 12). At 1102, the UE may receive, from a network node, communication parameters for a downlink transmission, the communication parameters indicative of a first resource element group (REG) bundle and a second REG bundle. For example, 1102 may be performed by a receiving component 1240. Here, the UE may receive the CORESET/superset configuration of the first communication 806/1006 of FIGS. 8 and 10.

At 1104, the UE may optionally identify a superset based on the indication of the virtual CORESET. For example, 1104 may be performed by an identifying component 1242. Here, information about the virtual CORESET may be included in the first communication 1006 of FIG. 10. It should be noted that the downlink transmission may be received within a control resource set (CORESET), wherein the communication parameters indicative of the first REG bundle and the second REG bundle comprises an indication of a virtual CORESET within the CORESET.

At 1106, the UE may optionally identify the first REG bundle and the second REG bundle associated with the superset. For example, 1106 may be performed by the identifying component 1242. Here, the UE may use the information about the virtual CORESET to determine the REG bundles as described in the second process 1010 of FIG. 10.

At 1108, the UE may receive the downlink transmission via the first REG bundle. For example, 1108 may be performed by the receiving component 1240. Here, the UE may receive the downlink transmission (e.g., PDCCH) via a particular REG bundle that the UE is monitoring. However, because the downlink transmission may be punctured by CRS configured to be transmitted in the same REG bundle, the UE may monitor multiple REG bundles (including the first REG bundle) in a superset in order to properly perform channel estimation. Receiving the downlink transmission is described, for example in the second transmission 810/1010 of FIGS. 8 and 10.

At 1110, the UE may optionally receive anther downlink transmission via the third REG bundle. For example, 1110 may be performed by the receiving component 1240. Here, the UE may receive multiple downlink transmissions over REG bundles it is configured to monitor.

At 1112, the UE may optionally receive reference signals transmitted over a fourth REG bundle, wherein the fourth REG bundle is contiguous in frequency with the third REG bundle and outside of the first superset and the second superset. For example, 1112 may be performed by the receiving component 1240. Here, the other REG bundle of 1110 may be part of another superset that includes the third REG bundle. At 1114, the UE may optionally perform channel estimation of the other downlink transmission based on reference signals transmitted over the third REG bundle and the fourth REG bundle. For example, 1114 may be performed by the channel estimating component 1244. Here, the UE may perform channel estimation of all the reference signals (e.g., DRMS) received over the REG bundles of the superset in order to demodulate the other downlink transmission.

At 1116, the UE may perform channel estimation of the downlink transmission based on reference signals transmitted over the first REG bundle and the second REG bundle. For example, 1116 may be performed by the channel estimating component 1244. Here, the UE may perform channel estimation using reference signals (e.g., DMRS) from multiple REG bundles in order to properly demodulate the downlink transmission received via one REG bundle.

At 1118, the UE may optionally determine a superset associated with the first REG bundle based on receiving the downlink transmission via the first REG bundle. For example, 1118 may be performed by a determining component 1246. For example, while the UE may determine a superset associated with a particular REG bundle in response to receiving a downlink transmission via that particular REG bundle, it should be noted that the UE may determine the associated supersets for all monitored REG bundles prior to receiving any transmissions from the base station.

At 1120, the UE may optionally perform channel estimation based on reference signals transmitted over each REG bundle of the first superset. For example, 1120 may be performed by the channel estimating component 1244. Here, the UE may perform channel estimation using reference signals received from REG bundles that are in the same superset as the REG bundle that carried the downlink transmission even though the other REG bundles did not carry the downlink transmission.

At 1122, the UE may optionally demodulate the downlink transmission received via the first REG bundle based on the channel estimation of the reference signals received over each REG bundle of the first superset. For example, 1122 may be performed by a demodulating component 1248.

In certain aspects, the downlink transmission is received within a control resource set (CORESET), and wherein the communication parameters for the downlink transmission further comprise an indication of a cell-specific reference signal (CRS) pattern transmitted within the CORESET.

In certain aspects, the downlink transmission is rate-matched around the CRS pattern. In certain aspects, the communication parameters comprise an indication of a superset configuration mapping the first REG bundle and the second REG bundle to a first superset.

In certain aspects, the first REG bundle and the second REG bundle share a same precoder.

In certain aspects, the superset configuration comprises a plurality of supersets including the first superset and a second superset, wherein each of the first superset and the second superset are uniquely mapped to at least one REG bundle.

In certain aspects, the UE is further configured to demodulate the downlink transmission received via the first REG bundle based on the channel estimation of the reference signals received over each REG bundle of the first superset.

In certain aspects, the indication of the virtual CORESET comprises an indication of a size of the superset.

In certain aspects, the communication parameters configure the UE to monitor: (i) the first REG bundle and the second REG bundle for the downlink transmission, and (ii) a third REG bundle for another downlink transmission, wherein the first REG bundle and the second REG bundle are mapped to a first superset, wherein the third REG bundle is mapped to a second superset, and wherein the first REG bundle, the second REG bundle, and the third REG bundle are contiguous in frequency.

In certain aspects, the first superset comprises more REG bundles than the second superset.

In certain aspects, the first REG bundle is defined by a first frequency channel, and wherein the second REG bundle is defined by a second frequency channel.

In certain aspects, the communication parameters are received via a radio resource control (RRC) message.

In certain aspects, the reference signals transmitted over the first REG bundle and the second REG bundle comprises a demodulation reference signal (DMRS).

In certain aspects, the downlink transmission is a physical downlink control channel (PDCCH).

Figure 12:
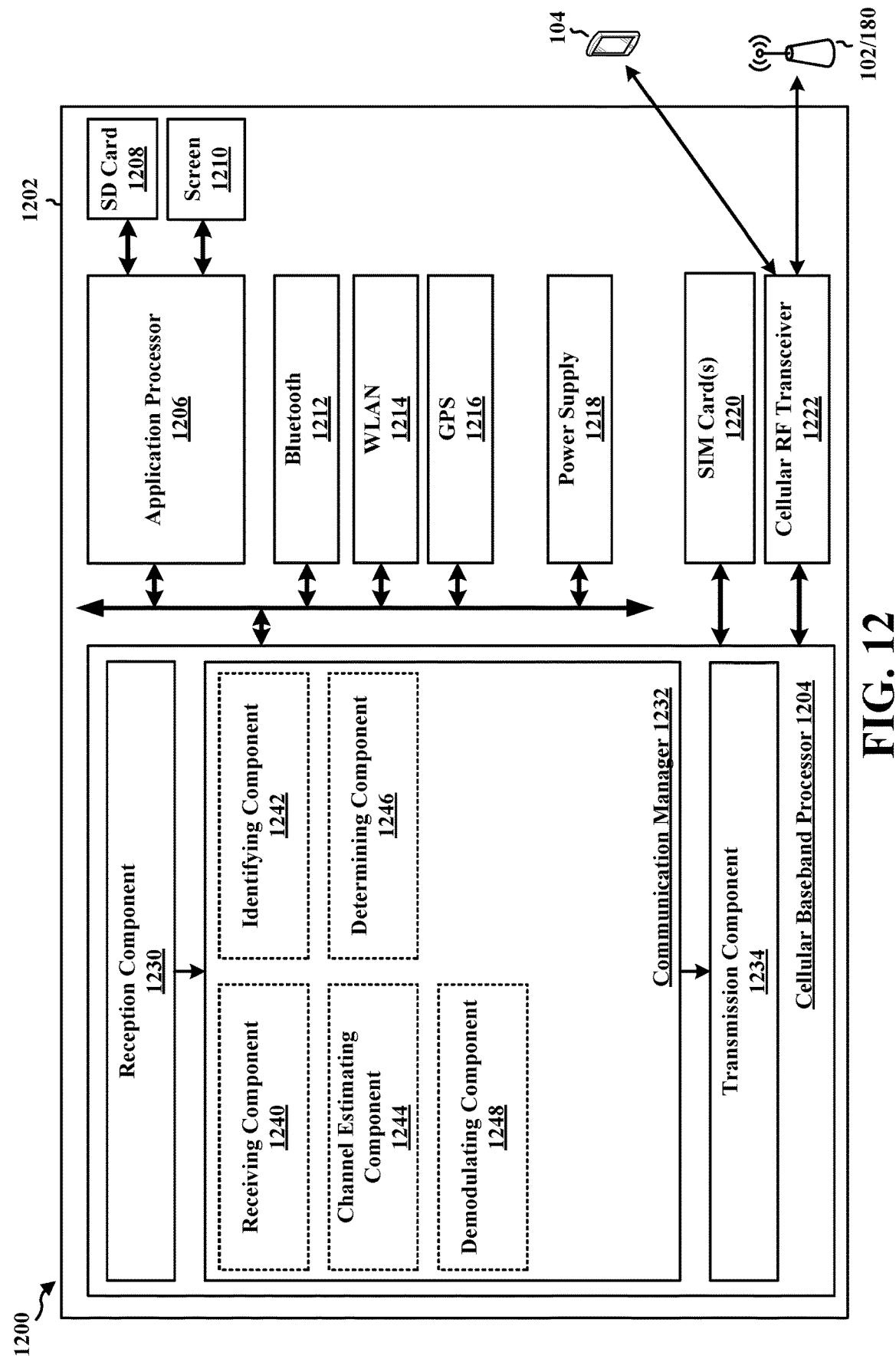
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a receiving component 1240 that is configured to receive, from a network node, communication parameters for a downlink transmission, the communication parameters indicative of a first resource element group (REG) bundle and a second REG bundle; receive the downlink transmission via the first REG bundle; receive the other downlink transmission via the third REG bundle; and receive reference signals transmitted over a fourth REG bundle, wherein the fourth REG bundle is contiguous in frequency with the third REG bundle and outside of the first superset and the second superset; e.g., as described in connection with the first communication 806/1006 and the second communication 810/1010 of FIGS. 8 and 10.

The communication manager 1232 further includes an identifying component 1242 that is configured to identify a superset based on the indication of the virtual CORESET; and identify the first REG bundle and the second REG bundle associated with the superset, wherein the downlink transmission is transmitted within a control resource set (CORESET), wherein the communication parameters indicative of the first REG bundle and the second REG bundle comprise an indication of a virtual CORESET within the CORESET; e.g., as described in connection with the first process 808/1008 of FIGS. 8 and 10.

The communication manager 1232 further includes a channel estimating component 1244 that is configured to perform channel estimation of the downlink transmission based on reference signals transmitted over the first REG bundle and the second REG bundle; perform channel estimation based on reference signals transmitted over each REG bundle of the first superset; and perform channel estimation of the other downlink transmission based on reference signals transmitted over the third REG bundle and the fourth REG bundle; e.g., as described in the second process 812 of FIG. 8 and the third process 1014 of FIG. 10.

The communication manager 1232 further includes a determining component 1246 that is configured to determine the first superset associated with the first REG bundle based on receiving the downlink transmission via the first REG bundle, e.g., as described in connection with the first process 1008 of FIG. 10. It should be noted that the determining may be performed at either of the first process 808, second process 812, or the second communication 810 of FIG. 8.

The communication manager 1232 further includes a demodulating component 1248 that is configured to demodulate the downlink transmission received via the first REG bundle based on the channel estimation of the reference signals received over each REG bundle of the first superset, e.g., as described in connection with the second process 812 of FIG. 8 and the third process 1014 of FIG. 10.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a network node, communication parameters for a downlink transmission, the communication parameters indicative of a first resource element group (REG) bundle and a second REG bundle; means for identifying a superset based on the indication of the virtual CORESET; means for identifying the first REG bundle and the second REG bundle associated with the superset; means for receiving the downlink transmission via the first REG bundle; means for receiving the other downlink transmission via the third REG bundle; means for receiving reference signals transmitted over a fourth REG bundle, wherein the fourth REG bundle is contiguous in frequency with the third REG bundle and outside of the first superset and the second superset; means for performing channel estimation of the other downlink transmission based on reference signals transmitted over the third REG bundle and the fourth REG bundle; means for performing channel estimation of the downlink transmission based on reference signals transmitted over the first REG bundle and the second REG bundle; means for determining the first superset associated with the first REG bundle based on receiving the downlink transmission via the first REG bundle; means for performing the channel estimation based on reference signaling transmitted over at least the first REG bundle and the second REG bundle of the first superset; and means for demodulating the downlink transmission received via the first REG bundle based on the channel estimation of the reference signals received over each REG bundle of the first superset.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 13 is a flowchart 1300 of a method of wireless communication. The method may be performed by a base station (e.g., the base station 102/180 of FIG. 1; the apparatus 1402 of FIG. 14. At 1302, the base station may determine a first superset of a plurality of supersets, wherein the first superset is uniquely mapped to at a first resource element group (REG) bundle and a second REG bundle. For example, 1302 may be performed by a determining component 1440 of FIG. 14. Here, the base station may generate a mapping between a superset of a plurality of supersets, and one or more REG bundles. The base station may then transmit the mapping to the UE as illustrated in the first communication 806/1006 of FIGS. 8 and 10.

At 1304, the base station may transmit communication parameters for a downlink transmission, the communication parameters indicative of the first REG bundle and the second REG bundle. For example, 1304 may be performed by a transmitting component 1442 of FIG. 14. Here, 1304 may be performed by the base station in the first communication 804/1004 of FIGS. 8 and 10.

At 1306, the base station may transmit the downlink transmission via the first REG bundle. For example, 1306 may be performed by the transmitting component 1442 of FIG. 14. Here, the base station transmits a downlink transmission to the UE, as illustrated in the second communication 810/1012 of FIGS. 8 and 10.

At 1308, the base station may transmit a reference signal for demodulating the first REG bundle via the first REG bundle and the second REG bundle. For example, 1308 may be performed by the transmitting component 1442 of FIG. 14. Here, the base station may transmit a DMRS in multiple REG bundles associated with the superset that is used to transmit the downlink transmission. For example, while the base station may only transmit the downlink transmission and DMRS via a single REG bundle, the base station may also transmit DMRS in all other REG bundles in the same superset so that the UE may perform channel estimation and demodulation. The base station may transmit the DMRS in all the REG bundles of the superset in, for example, the second communication 810/1012 of FIGS. 8 and 10.

In certain aspects, the downlink transmission is transmitted within a control resource set (CORESET), and wherein the communication parameters for the downlink transmission further comprise an indication of a cell-specific reference signal (CRS) pattern transmitted within the CORESET.

In certain aspects, the downlink transmission is rate-matched around the CRS pattern. In certain aspects, the communication parameters comprise an indication of a superset configuration mapping the first REG bundle and the second REG bundle to a first superset.

In certain aspects, the first REG bundle and the second REG bundle share a same precoder.

In certain aspects, the superset configuration comprises a plurality of supersets including the first superset and a second superset, wherein each of the first superset and the second superset are uniquely mapped to at least one REG bundle.

In certain aspects, the downlink transmission is transmitted within a control resource set (CORESET), wherein the communication parameters indicative of the first REG bundle and the second REG bundle comprises an indication of a virtual CORESET within the CORESET.

In certain aspects, the indication of the virtual CORESET comprises an indication of a size of the superset.

In certain aspects, the first REG bundle is defined by a first frequency channel, and wherein the second REG bundle is defined by a second frequency channel.

In certain aspects, the communication parameters are received via a radio resource control (RRC) message.

In certain aspects, the reference signals transmitted over the first REG bundle and the second REG bundle comprises a demodulation reference signal (DMRS).

Figure 14:
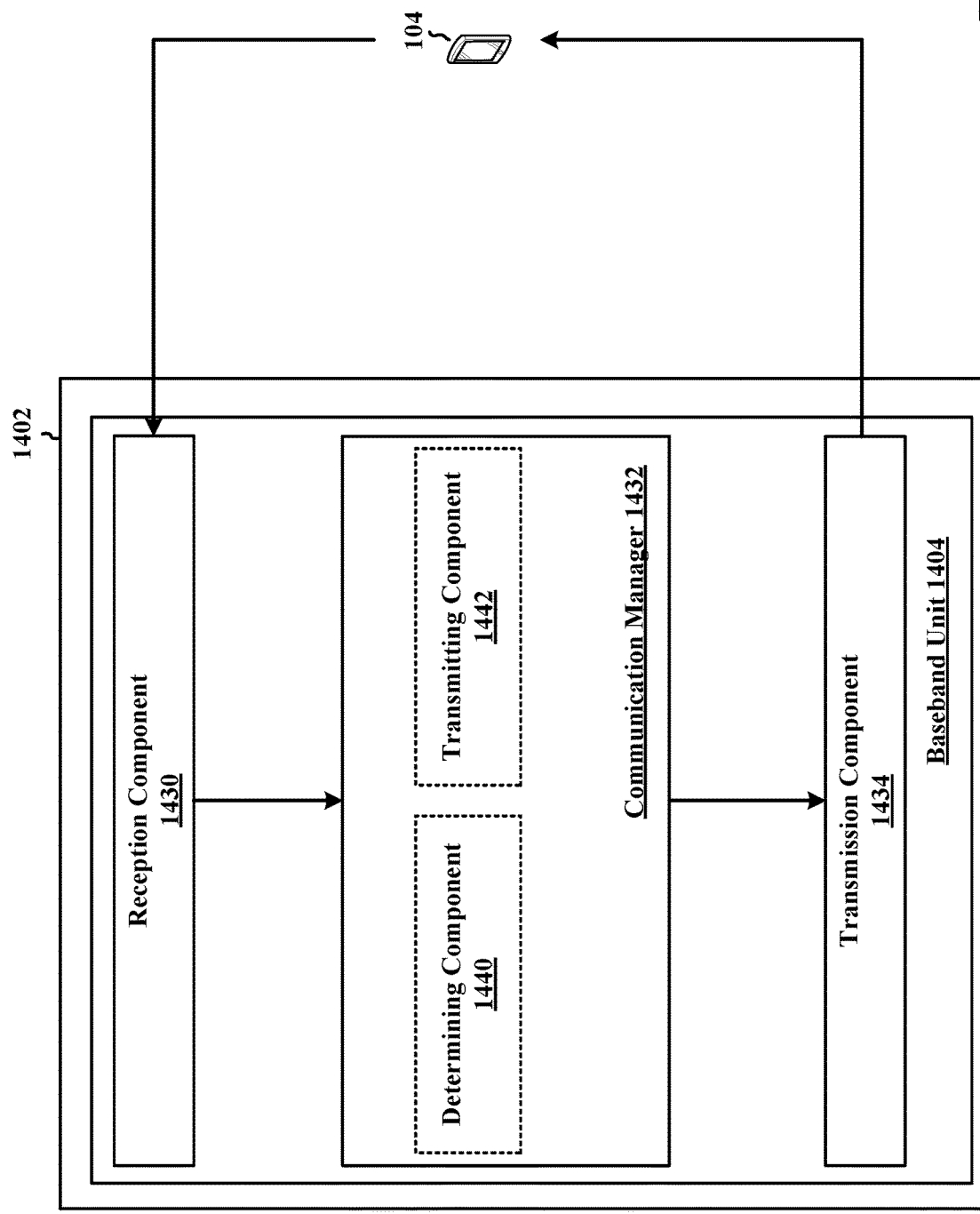
FIG. 14 is a diagram illustrating another example of a hardware implementation for another example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a determining component 1440 for determining a first superset of a plurality of supersets, wherein the first superset is uniquely mapped to at a first resource element group (REG) bundle and a second REG bundle, e.g., as described in connection with 1302 of FIG. 13.

The communication manager 1432 further includes a transmitting component 1442 for transmitting communication parameters for a downlink transmission, the communication parameters indicative of the first REG bundle and the second REG bundle; transmit the downlink transmission via the first REG bundle; transmitting a reference signal for demodulating the first REG bundle via the first REG bundle and the second REG bundle; and transmitting a reference signal for demodulating the first REG bundle via the first REG bundle and the second REG bundle; e.g., as described in connection with 1304, 1306, and 1308 of FIG. 13.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for determining a first superset of a plurality of supersets, wherein the first superset is uniquely mapped to a first resource element group (REG) bundle and a second REG bundle; means for transmitting communication parameters for a downlink transmission, the communication parameters indicative of the first REG bundle and the second REG bundle; means for transmitting the downlink transmission via the first REG bundle; and means for transmitting a reference signal for demodulating the first REG bundle via the first REG bundle and the second REG bundle.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication by a user equipment (UE), comprising: receiving, from a network node, communication parameters for a downlink transmission, the communication parameters indicative of a first resource element group (REG) bundle and a second REG bundle; receiving the downlink transmission via the first REG bundle; and performing channel estimation of the downlink transmission based on reference signals transmitted over the first REG bundle and the second REG bundle.

Example 2 is the method of example 1, wherein the downlink transmission is received within a control resource set (CORESET), and wherein the communication parameters for the downlink transmission further comprise an indication of a cell-specific reference signal (CRS) pattern transmitted within the CORESET.

Example 3 is the method of example 2, wherein the downlink transmission is punctured by the CRS pattern, or wherein the downlink transmission is rate-matched around the CRS pattern.

Example 4 is the method of any of examples 1-3, wherein the communication parameters comprise an indication of a superset configuration mapping the first REG bundle and the second REG bundle to a first superset.

Example 5 is the method of any of examples 1-4, wherein the first REG bundle and the second REG bundle share a same precoder.

Example 6 is the method of any of examples 1-5, wherein the superset configuration comprises a plurality of supersets including the first superset and a second superset, wherein each of the first superset and the second superset are uniquely mapped to at least one REG bundle.

Example 7 is the method of any of examples 1-6, wherein performing channel estimation of the downlink transmission further comprises: determining the first superset associated with the first REG bundle based on receiving the downlink transmission via the first REG bundle; and performing the channel estimation based on reference signaling transmitted over at least the first REG bundle and the second REG bundle of the first superset.

Example 8 is the method of example 7, further comprising demodulating the downlink transmission received via the first REG bundle based on the channel estimation of the reference signals received over each REG bundle of the first superset.

Example 9 is the method of any of examples 1-8, wherein the downlink transmission is transmitted within a control resource set (CORESET), wherein the communication parameters indicative of the first REG bundle and the second REG bundle comprise an indication of a virtual CORESET within the CORESET, and wherein the method further comprises: identifying a superset based on the indication of the virtual CORESET; and identifying the first REG bundle and the second REG bundle associated with the superset.

Example 10 is the method of example 9, wherein the indication of the virtual CORESET comprises an indication of a size of the superset.

Example 11 is the method of any of examples 1-10, wherein the communication parameters configure the UE to monitor: (i) the first REG bundle and the second REG bundle for the downlink transmission, and (ii) a third REG bundle for another downlink transmission, wherein the first REG bundle and the second REG bundle are mapped to a first superset, wherein the third REG bundle is mapped to a second superset, and wherein the first REG bundle, the second REG bundle, and the third REG bundle are contiguous in frequency.

Example 12 is the method of example 11, further comprising: receiving the other downlink transmission via the third REG bundle; receiving reference signals transmitted over a fourth REG bundle, wherein the fourth REG bundle is contiguous in frequency with the third REG bundle and outside of the first superset and the second superset; and performing channel estimation of the other downlink transmission based on reference signals transmitted over the third REG bundle and the fourth REG bundle.

Example 13 is the method of any of examples 11 and 12, wherein the first superset comprises more REG bundles than the second superset.

Example 14 is the method of any of examples 1-13, wherein the first REG bundle is defined by a first frequency channel, and wherein the second REG bundle is defined by a second frequency channel.

Example 15 is the method of any of examples 1-14, wherein the communication parameters are received via a radio resource control (RRC) message.

Example 16 is the method of any of examples 1-15, wherein the reference signals transmitted over the first REG bundle and the second REG bundle comprises a demodulation reference signal (DMRS).

Example 17 is the method of any of examples 1-16, wherein the downlink transmission is a physical downlink control channel (PDCCH).

Example 18 is a method for wireless communication by a network node, comprising: determining a first superset of a plurality of supersets, wherein the first superset is uniquely mapped to at a first resource element group (REG) bundle and a second REG bundle; transmitting communication parameters for a downlink transmission, the communication parameters indicative of the first REG bundle and the second REG bundle; transmitting the downlink transmission via the first REG bundle; and transmitting a reference signal for demodulating the first REG bundle via the first REG bundle and the second REG bundle.

Example 19 is the method of example 18, wherein the downlink transmission is transmitted within a control resource set (CORESET), and wherein the communication parameters for the downlink transmission further comprise an indication of a cell-specific reference signal (CRS) pattern transmitted within the CORESET.

Example 20 is the method of any of examples 18 and 19, wherein the downlink transmission is punctured by the CRS pattern, or wherein the downlink transmission is rate-matched around the CRS pattern.

Example 21 is the method of any of examples 18-20, wherein the communication parameters comprise an indication of a superset configuration mapping the first REG bundle and the second REG bundle to a first superset.

Example 22 is the method of example 21, wherein the first REG bundle and the second REG bundle share a same precoder.

Example 23 is the method of any of examples 21 and 22, wherein the superset configuration comprises a plurality of supersets including the first superset and a second superset, wherein each of the first superset and the second superset are uniquely mapped to at least one REG bundle.

Example 24 is the method of any of examples 18-23, wherein the downlink transmission is transmitted within a control resource set (CORESET), wherein the communication parameters indicative of the first REG bundle and the second REG bundle comprises an indication of a virtual CORESET within the CORESET.

Example 25 is the method of example 24, wherein the indication of the virtual CORESET comprises an indication of a size of the superset.

Example 26 is the method of any of examples 18-25, wherein the first REG bundle is defined by a first frequency channel, and wherein the second REG bundle is defined by a second frequency channel.

Example 27 is the method of any of examples 18-26, wherein the communication parameters are received via a radio resource control (RRC) message.

Example 28 is the method of any of examples 18-27, wherein the reference signals transmitted over the first REG bundle and the second REG bundle comprises a demodulation reference signal (DMRS).

Example 29 is a user equipment (UE) comprising: a memory; and a processor coupled to the memory, the processor and memory being configured to perform the method of any of claims 1-17.

Example 30 is a network node comprising: a memory; and a processor coupled to the memory, the processor and memory being configured to perform the method of any of claims 18-28.

Example 31 is a user equipment (UE) comprising: one or more means for performing the method of any of claims 1-17.

Example 32 is a network node comprising: one or more means for performing the method of any of claims 18-28.

Example 33 is a non-transitory computer-readable storage medium having instructions stored thereon for performing the method of any of claims 1-17 for wireless communication by a user equipment (UE).

Example 34 is a non-transitory computer-readable storage medium having instructions stored thereon for performing the method of any of claims 18-28 for wireless communication by a network node.

What is claimed is:

1. A user equipment (UE) configured for wireless communication, comprising:
 a processor;
 a memory coupled with the processor; and
 instructions stored in the memory and operable, when executed by the processor, to cause the UE to:
  receive, from a network node, communication parameters for a downlink transmission to be received within a control resource set (CORESET), the communication parameters being indicative of a first resource element group (REG) bundle and a second REG bundle and comprising an indication of a virtual CORESET within the CORESET;
  identify a first superset based on the indication of the virtual CORESET;
  identify the first REG bundle and the second REG bundle associated with the first superset;
  receive, within the CORESET, the downlink transmission via the first REG bundle; and
  perform channel estimation of the downlink transmission based on reference signals transmitted via the first REG bundle and the second REG bundle.

2. The UE of claim 1, wherein the communication parameters for the downlink transmission further comprise an indication of a cell-specific reference signal (CRS) pattern transmitted within the CORESET.

3. The UE of claim 2, wherein the CRS pattern is configured by a network, and wherein the downlink transmission is punctured by the CRS pattern, or wherein the downlink transmission is rate-matched around the CRS pattern.

4. The UE of claim 1, wherein the communication parameters further comprise an indication of a superset configuration that maps the first REG bundle and the second REG bundle to the first superset.

5. The UE of claim 4, wherein the first REG bundle and the second REG bundle share a same precoder.

6. The UE of claim 4, wherein the superset configuration comprises a plurality of supersets including the first superset and a second superset, wherein each of the first superset and the second superset are uniquely mapped to at least one REG bundle.

7. The UE of claim 4, wherein the UE, being configured to perform the channel estimation of the downlink transmission, is further configured to:

determine the first superset associated with the first REG bundle based on receiving the downlink transmission via the first REG bundle; and perform the channel estimation based on reference signals transmitted over at least the first REG bundle and the second REG bundle of the first superset.

8. The UE of claim 7, wherein the UE is further configured to demodulate the downlink transmission received via the first REG bundle based on the channel estimation of the reference signals received via each at least the first REG bundle and the second REG bundle of the first superset.

9. The UE of claim 1, wherein the indication of the virtual CORESET comprises an indication of a size of the first superset.

10. The UE of claim 1, wherein the communication parameters configure the UE to monitor: (i) the first REG bundle and the second REG bundle for the downlink transmission, and (ii) a third REG bundle for another downlink transmission, wherein the first REG bundle and the second REG bundle are mapped to the first superset, wherein the third REG bundle is mapped to a second superset, and wherein the first REG bundle, the second REG bundle, and the third REG bundle are contiguous in frequency.

11. The UE of claim 10, wherein the UE is further configured to:
receive the other downlink transmission via the third REG bundle;
receive reference signals transmitted via a fourth REG bundle, wherein the fourth REG bundle is contiguous in frequency with the third REG bundle and outside of the first superset and the second superset; and
perform channel estimation of the other downlink transmission based on reference signals transmitted via the third REG bundle and the fourth REG bundle.

12. The UE of claim 10, wherein the first superset comprises more REG bundles than the second superset.

13. The UE of claim 1, wherein the first REG bundle is defined by a first frequency channel, and wherein the second REG bundle is defined by a second frequency channel.

14. The UE of claim 1, wherein the communication parameters are received via a radio resource control (RRC) message.

15. The UE of claim 1, wherein the reference signals transmitted via the first REG bundle and the second REG bundle comprises a demodulation reference signal (DMRS).

16. The UE of claim 1, wherein the downlink transmission is a physical downlink control channel (PDCCH).

17. A network node configured for wireless communication, comprising:
a processor;
a memory coupled with the processor; and
instructions stored in the memory and operable, when executed by the processor, to cause the network node to:
determine a first superset of a plurality of supersets, wherein the first superset is uniquely mapped to at a first resource element group (REG) bundle and a second REG bundle;
transmit communication parameters for a downlink transmission to be transmitted within a control resource set (CORESET), the communication parameters being indicative of the first REG bundle and the second REG bundle and comprising an indication of a virtual CORESET within the CORESET;
transmit, within the CORESET, the downlink transmission via the first REG bundle; and transmit a reference signal for demodulating the first REG bundle via the first REG bundle and the second REG bundle.

18. The network node of claim 17, wherein the communication parameters for the downlink transmission further comprise an indication of a cell-specific reference signal (CRS) pattern transmitted within the CORESET.

19. The network node of claim 18, where the CRS pattern is configured by the network node, and wherein the downlink transmission is punctured by the CRS pattern, or wherein the downlink transmission is rate-matched around the CRS pattern.

20. The network node of claim 17, wherein the communication parameters further comprise an indication of a superset configuration that maps the first REG bundle and the second REG bundle to the first superset.

21. The network node of claim 20, wherein the first REG bundle and the second REG bundle share a same precoder.

22. The network node of claim 20, wherein the superset configuration comprises a plurality of supersets including the first superset and a second superset, wherein each of the first superset and the second superset are uniquely mapped to at least one REG bundle.

23. The network node of claim 17, wherein the indication of the virtual CORESET comprises an indication of a size of the first superset.

24. The network node of claim 17, wherein the first REG bundle is defined by a first frequency channel, and wherein the second REG bundle is defined by a second frequency channel.

25. The network node of claim 17, wherein the communication parameters are received via a radio resource control (RRC) message.

26. The network node of claim 17, wherein the reference signal transmitted via the first REG bundle and the second REG bundle comprises a demodulation reference signal (DMRS).

27. A method for wireless communication by a user equipment (UE), comprising:
receiving, from a network node, communication parameters for a downlink transmission to be received within a control resource set (CORESET), the communication parameters being indicative of a first resource element group (REG) bundle and a second REG bundle and comprising an indication of a virtual CORESET within the CORESET;
identifying a first superset based on the indication of the virtual CORESET;
identifying the first REG bundle and the second REG bundle associated with the first superset;
receiving, within the CORESET, the downlink transmission via the first REG bundle; and
performing channel estimation of the downlink transmission based on reference signals transmitted via the first REG bundle and the second REG bundle.

28. A method for wireless communication by a network node, comprising:
determining a first superset of a plurality of supersets, wherein the first superset is uniquely mapped to at a first resource element group (REG) bundle and a second REG bundle;
transmitting communication parameters for a downlink transmission to be transmitted within a control resource set (CORESET), the communication parameters being indicative of the first REG bundle and the second REG bundle and comprising an indication of a virtual CORESET within the CORESET;

transmitting, within the CORESET, the downlink transmission via the first REG bundle; and
transmitting a reference signal for demodulating the first REG bundle via the first REG bundle and the second REG bundle.

* * * * *